(12) United States Patent
Tseng et al.

(10) Patent No.: US 12,022,551 B2
(45) Date of Patent: Jun. 25, 2024

(54) METHOD AND APPARATUS FOR SIDELINK COMMUNICATION MANAGEMENTS

(71) Applicant: FG Innovation Company Limited, Tuen Mun (HK)

(72) Inventors: Yung-Lan Tseng, Taipei (TW); Hung-Chen Chen, Taipei (TW); Mei-Ju Shih, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 178 days.

(21) Appl. No.: 17/437,208

(22) PCT Filed: Mar. 5, 2020

(86) PCT No.: PCT/CN2020/077927
§ 371 (c)(1),
(2) Date: Sep. 8, 2021

(87) PCT Pub. No.: WO2020/182045
PCT Pub. Date: Sep. 17, 2020

(65) Prior Publication Data
US 2022/0174774 A1    Jun. 2, 2022

Related U.S. Application Data

(60) Provisional application No. 62/815,465, filed on Mar. 8, 2019.

(51) Int. Cl.
*H04W 76/23* (2018.01)
*H04W 72/1263* (2023.01)
(Continued)

(52) U.S. Cl.
CPC ....... *H04W 76/23* (2018.02); *H04W 72/1263* (2013.01); *H04W 88/06* (2013.01); *H04W 92/18* (2013.01)

(58) Field of Classification Search
CPC ........ H04W 76/23; H04W 76/34; H04W 4/40
See application file for complete search history.

(56) References Cited

U.S. PATENT DOCUMENTS

| 2017/0280486 A1 | 9/2017 | Lee et al. | |
| 2017/0353819 A1* | 12/2017 | Yin | H04W 4/70 |
| 2020/0252989 A1* | 8/2020 | Chen | H04L 5/0048 |

FOREIGN PATENT DOCUMENTS

| CN | 107846434 A | 3/2018 |
| WO | 2017/014716 A1 | 1/2017 |

OTHER PUBLICATIONS

LG Electronics Inc., "MAC modeling for ProSe communication", R2-145036, 3GPP TSG-RAN WG2 Meeting #88 San Francisco, USA, Nov. 17-Nov. 21, 2014.
(Continued)

*Primary Examiner* — Sulaiman Nooristany
(74) *Attorney, Agent, or Firm* — ScienBiziP, P.C.

(57) ABSTRACT

A method of wireless communication is provided. The method includes performing a first Medium Access Control (MAC) procedure on a first radio access interface for a first Sidelink (SL) connection between the UE and a target UE of a first destination on a second radio access interface; and releasing or canceling the first MAC procedure in a case that the UE is indicated to perform an MAC reset operation associated with the first SL connection based on at least one triggering event associated with the target UE and the second radio access interface.

14 Claims, 18 Drawing Sheets

(51) Int. Cl.
   H04W 88/06     (2009.01)
   H04W 92/18     (2009.01)

(56) References Cited

OTHER PUBLICATIONS

"3rd Generation Partnership Project; Technical Specification Group Radio Access Network; NR; Study on Vehicle-to-Everything(Release 16)", 3GPP TR 38.885 V1.0.0 (Nov. 2018), Nov. 29, 2018.
ZTE, Sanechips, "Analysis of Mode 2 resource schemes on sidelink", 3GPP TSG RAN WG1 #96 R1-1901880, Feb. 25-Mar. 1, 2019.
OPPO, "Discussion on UE autonomous RA in NR-V2X", 3GPP TSG RAN WG1 #96 R1-1902389, Feb. 25-Mar. 1, 2019.
CATT, "Sidelink SR/BSR in Uu Interface", 3GPP TSG RAN WG2 #105 R2-1900219, Feb. 25-Mar. 1, 2019.
3rd Generation Partnership Project; Technical Specification Group Radio Access Network; NR; Medium Access Control (MAC) protocol specification (Release 15) 3GPP TS 38.321 V15.4.0 (Dec. 2018).
3GPP TS 36.214, "3rd Generation Partnership Project; Technical Specification Group Radio Access Network; Evolved Universal Terrestrial Radio Access (E-UTRA); Physical layer; Measurements (Release 15)", V15.3.0 (Sep. 2018).
3GPP TS 38.321, "3rd Generation Partnership Project; Technical Specification Group Radio Access Network; NR; Medium Access Control (MAC) protocol specification (Release 15)", V15.3.0 (Sep. 2018).
3GPP TS 38.211, "3rd Generation Partnership Project; Technical Specification Group Radio Access Network; NR; Physical channels and modulation (Release 15)", V15.4.0 (Dec. 2018).
3GPP TS 36.321, "3rd Generation Partnership Project; Technical Specification Group Radio Access Network; Evolved Universal Terrestrial Radio Access (E-UTRA); Medium Access Control (MAC) protocol specification (Release 15)", V15.4.0 (Dec. 2018).
3GPP TS 38.331, "3rd Generation Partnership Project; Technical Specification Group Radio Access Network; NR; Radio Resource Control (RRC) protocol specification (Release 15)", V15.4.0 (Dec. 2018).

* cited by examiner

METHOD AND APPARATUS FOR SIDELINK COMMUNICATION MANAGEMENTS

CROSS-REFERENCE TO RELATED APPLICATION(S)

The present application is the National Stage of International Application No. PCT/CN2020/077927, filed on Mar. 5, 2020, entitled "Method and Apparatus for Sidelink Communication Managements," which claims the benefit of and priority to U.S. Provisional Patent Application Ser. No. 62/815,465, filed on Mar. 8, 2019, entitled "Sidelink Medium Access Control (MAC) Function Designs," the contents of all of which are hereby incorporated fully by reference into the present application.

FIELD

The present disclosure generally relates to wireless communications, and more particularly, to methods and apparatuses for sidelink (SL) communication managements.

BACKGROUND

Wireless communication systems may support direct communications between wireless communication devices (e.g., User Equipment (UE)). Examples of direct communications include Device-to-Device (D2D) communications, Vehicle-to-Everything (V2X) communications, and the like. Direct communications may also be referred to as SL communications. SL communications allow two or more wireless communication devices (e.g., UEs) to communicate with each other without the need of a Base Station (BS) (or any other intervening device). However, the management mechanism for SL communications in the current wireless communication system may not be adequate for UEs operating with multiple radio access interfaces.

SUMMARY

The present disclosure is directed to methods and apparatuses for SL communication managements.

According to an aspect of the present disclosure, a User Equipment (UE) is provided. The UE includes one or more non-transitory computer-readable media having computer-executable instructions embodied thereon and at least one processor coupled to the one or more non-transitory computer-readable media. The at least one processor is configured to execute the computer-executable instructions to perform a first Medium Access Control (MAC) procedure on a first radio access interface for a first Sidelink (SL) connection between the UE and a target UE of a first destination on a second radio access interface; and release or cancel the first MAC procedure in a case that the UE is indicated to perform an MAC reset operation associated with the first SL connection based on at least one triggering event associated with the target UE and the second radio access interface.

According to another aspect of the present disclosure, a method of wireless communication is provided. The method includes performing a first Medium Access Control (MAC) procedure on a first radio access interface for a first Sidelink (SL) connection between the UE and a target UE of a first destination on a second radio access interface; and releasing or canceling the first MAC procedure in a case that the UE is indicated to perform an MAC reset operation associated with the first SL connection based on at least one triggering event associated with the target UE and the second radio access interface.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
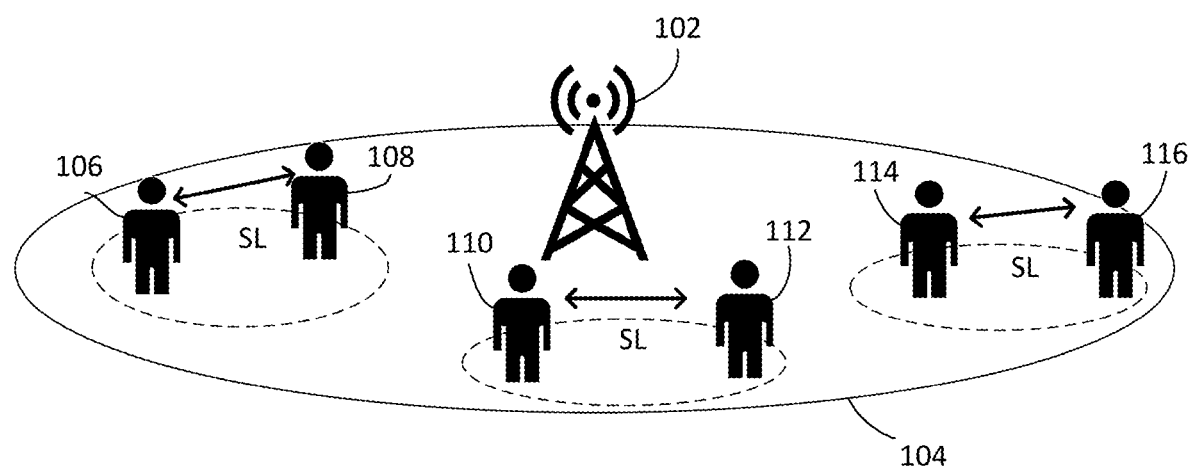
FIG. 1 is a schematic diagram illustrating SL operations for UEs, in accordance with an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G New Radio (NR) Radio Access Network (RAN)) typically includes at least one BS, at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UNITS, an evolved Node B (eNB) as in the LTE or LTE-A, a Radio Network Controller (RNC) as in the UNITS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS may be operable to provide radio coverage to a specific geographical area using a plurality of cells being included in the RAN. The BS supports the operations of the cells. Each cell may be operable to provide services to at least one UE within its radio coverage. More specifically, each cell (often referred to as a serving cell) may provide services to serve one or more UEs within its radio coverage (e.g., each cell schedules the downlink and optionally uplink (UL) resources to at least one UE within its radio coverage for downlink and optionally UL packet transmissions). The BS may communicate with one or more UEs in the radio communication system through the plurality of cells. A cell may allocate SL resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval of a single NR frame, a Downlink (DL) transmission data, a guard period, and a UL transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

1) V2X Service & Cellular V2X Service

V2X service is provided to support the information exchange between vehicles. In LTE protocols, V2X service may be supported in the air interface by the Uu interface and PC5 interface. The PC5 interface may cover the designs in Layer 2 and Layer 1. The airlink interface on PC5 interface may also called SL in LTE protocols.

FIG. 1 is a schematic diagram illustrating SL operations for UEs, in accordance with an example implementation of the present application.

As shown in FIG. 1, with SL operations, UEs 106, 108, 110, 112, 114 and 116 in radio coverage 104 of BS 102 (e.g., an eNB in an LTE network) may exchange data and control signaling directly without the relaying of BS 102. For the convenience of description, the UEs described in various implementations of the present application may be capable and authorized to access V2X service and/or the PC5 interface with neighbor UEs and RAN.

In the 3GPP RAN Release 16 (Rel. 16), the V2X service may be further categorized based on different cast-types, such as:

Unicast: Only two UEs in one SL group and the formulation of the SL group may be achieved in the Non-Access-Stratum (NAS) layer (e.g., V2X application layer or PC5-S protocols) or in the Access-Stratum (AS) layer.

Multi-cast (Groupcast): More than two UEs are grouped in one SL group to exchange SL packets with all other members in the SL group. In one implementation, SL groups may be formulated in Non-Access-Stratum (NAS) layer (e.g., V2X application layer or PC5-S protocols) or AS layer (e.g., SL Radio Resource Control Layer signaling, PC5-RRC signaling).

Broadcast: No limitation to the SL group. A UE is able to broadcast message(s) and its neighbor UE(s) under the SL communication range may receive and decode the broadcasting message(s) successfully. In some implementations, the SL communication range may differ with Transmit (Tx) power, hardware sensitivity, etc.

To enable SL operations under the coverage of the E-UTRAN, cells may provide SL configurations and SL resource allocations to UEs. To the UEs which is under the coverage of the cellular networks, the UEs may need to perform SL operations based on the configuration of the cellular network. To enable SL operations under the coverage of the E-UTRAN, the serving cell (or camped cells) may need to provide SL configurations and SL resource allocations to UEs.

There may be two basic approaches provided for SL resource allocation in LTE V2X service:

(1) Scheduled resource allocation:

The UE needs to operate in the RRC connected state (RRC CONNECTED) in order to transmit data. The RRC connected state may include LTE RRC connected state in LTE RRC protocols and NR RRC connected state in NR RRC protocols.

The UE may request SL resources from the eNB (e.g., by sending SL buffer status report to the serving cell). The eNB may schedule dedicated SL resources for the UE to transmit the SL control information and SL data. To achieve this, the eNB may request the UE to report an SL buffer status report through the Uu interface. In addition, the UE may also trigger a Scheduling Request (SR) on UL physical resource (e.g., Physical Uplink Control Channel (PUCCH)) or initiate Random Access (RA) procedure while the UE wants to transmit an SL-Buffer Status Report (BSR) to the eNB but the valid UL resource is absent. Also note the SR resource (or configurations) and the SR procedure may be common for both SL operations and UL traffic.

(2) UE autonomous resource selection from SL resource pools:

UE autonomous resource selection may be applied to both (LTE/NR) RRC connected UE (e.g., through dedicated RRC signaling or through system information broadcast by the BS) and (LTE/NR) RRC inactive/idle UE (e.g., through system information broadcast by the BS), where the RRC connected UE, the RRC inactive UE, and the RRC idle UE may refer to UEs operating in the RRC connected state, the RRC inactive state (RRC INACTIVE), and the RRC idle state (RRC IDLE), respectively.

Resource pool is a set of (virtually continuous) resource blocks and so a UE may decide which physical resource blocks that the UE wants to apply for SL packet transmission autonomously.

The UE on its own may select resources from resource pools and perform transport format selection to transmit SL control information and data.

The UE may perform sensing for (re)selection of SL resources before SL packet delivery. Based on sensing results, the UE may (re)select some specific SL resources and reserve multiple SL resources. Up to 2 parallel (independent) resource reservation processes may be allowed to be performed by the UE. The UE may be also allowed to perform a single resource selection for its V2X SL transmission.

In some implementations, when a UE is out of coverage on the frequency used for V2X SL communication and if the serving eNB does not provide V2X SL configuration for that frequency, the UE may use a set of transmission and reception resource pools that is pre-configured in the UE. V2X SL communication resources may not be shared with other non-V2X data transmitted over SL. In some implementations, the UE may obtain the pre-configuration through an installed UNITS Subscriber Identity Module (USIM), stored memory, or through RAN which the UE has been accessed earlier. Moreover, the UE may implement a PC5 interface by synchronizing with Global Navigation Satellite System (GNSS) and applying pre-configuration. In this condition, the PC5 interface may be independent with RAN and Uu interface. However, in some scenarios, the MAC reset caused by the Uu interface may still impact the PC5 interface.

2) V2X Platoon Scenario

Figure 2:
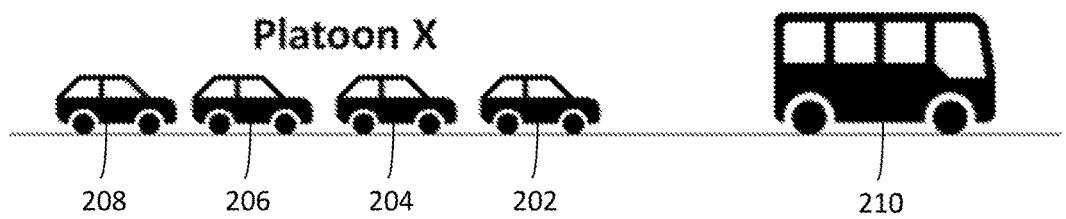
FIG. 2 is a schematic diagram illustrating UEs forming a V2X platoon, in accordance with an example implementation of the present application.

FIG. 2 is a schematic diagram illustrating UEs forming a V2X platoon (platoon X), in accordance with an example implementation of the present application.

In the platooning scenario, as shown in FIG. 2, platoon X may include several vehicles (or UEs) 202, 204, 206 and 208, where there may be (at least) one scheduler (e.g., vehicle 202) in platoon X. In addition, vehicle 210 may be a UE that is not included in platoon X. In platoon X, the scheduler (e.g., vehicle 202) may configure SL resources to members (e.g., vehicles 204, 206 and 208) in the same platoon X through the following approaches:

(1) Mode 1-like approach: the scheduler (e.g., vehicle 202) may configure dynamic SL grants to members (e.g., vehicles 204, 206 and 208) in the same platoon (e.g., by a dynamic SL grant through SL control information). In addition, the scheduler may also configure semi-periodic SL grant (e.g., configured SL grant/SL configured grant) to the members through SL control signaling (e.g., through Physical SL Broadcast Channel, or SL Radio Resource Control (RRC) signaling). To achieve Mode 1-like approach, the scheduler may need UEs to provide feedback information through PC5 interface.

(2) Mode 2-like approach: the scheduler (e.g., vehicle 202) may configure SL resource pools to members (e.g., vehicles 204, 206 and 208) in the same platoon. The vehicles may select SL grants by the vehicles themselves automatically (e.g., SL grant selection w/wo sensing). The platoon scenario may be applied when the vehicles (e.g., vehicles 202, 204, 206 and 208) of the platoon is in-coverage (e.g., all of the vehicles in the platoon are under the coverage of cellular radio access network); out-of-coverage (e.g., all of the vehicles in the platoon are out of the coverage of cellular radio access network); or partial in-coverage (e.g., some of the vehicles in the platoon is in-coverage and the other vehicles in the platoon is out-of-coverage).

To support the scheduler (e.g., vehicle 202), the members (e.g., vehicles 204, 206 and 208) in the platoon (e.g., platoon X) may need to support the following to report their own status to the scheduler through PC5 interface:

(a) SL Scheduling Request (SL-SR) configuration & report, (b) SL Buffer Status Report (SL-BSR) configuration & report, and (c) SL Power Headroom Report (SL-PHR) configuration & report.

However, it is observed that a MAC reset operation (e.g., caused by the Uu interface) may impact the transmission/reception (and also the Quality of Service (QoS)) of the PC5 interface. For example, based on the 3GPP TS38.331, a MAC reset operation may be triggered in the following events shown in Table 1:

TABLE 1

MAC Reset Events which may trigger a MAC Reset Operation (MAC Reset) according to NR Protocols
Events which may trigger MAC Reset according to New Radio Protocols

| MAC Reset Events | RRC state |
|---|---|
| 1. T300 Expires (RRC Connection establishment failure) | Remain in RRC idle state |
| 2. If upper layers abort the RRC connection establishment procedure while the UE has not yet entered RRC_CONNECTED | Remain in RRC idle state |
| 3. HO to NR failure (e.g., if T304 expires when RRCReconfiguration is received via other RAT) | Move from RRC connected state to RRC idle state |
| 4. When RRC re-establishment procedure is initiated | Remain in RRC connected state |
| 5. When receiving RRCRelease includes suspendConfig (instructing UE to move to RRC inactive state) | Move from RRC connected state to RRC inactive state |
| 6. When UE moving to RRC idle state | Move from RRC connected/inactive state to RRC idle state |
| 7. After the UE receiving RRCReject message | Move from RRC inactive state to RRC idle state |
| 8. If cell reselection occurs while waiting for the acknowledgment for SI request from lower layers | While in RRC idle/RRC inactive state |

As shown in Table 1, the MAC reset may happen in each RRC state, which also means that the SL operation may also be impacted in each RRC state. Moreover, based on the definition of MAC reset in TS38.321 (as shown in Table 2), some of the procedures may be inevitably be impacted by the MAC reset, since there may be only one MAC entity to each cell group (e.g., either the Master Cell Group (MCG) or the Secondary Cell Group (SCG)) and each MAC entity may manage both Uu interface and PC5 interface. In addition, in NR-V2X services, the MAC reset may be caused by the Uu interface (e.g., the events summarized in Table 1) and/or caused by the PC5 interface. Thus, the impact of MAC reset (which caused by the Uu interface) on the PC5 interface is described. In addition, to prevent the PC5 interface from being impacted by the MAC reset (e.g., caused by the Uu interface), the MAC entity may keep some SL procedures (and resources) on UL or SL. The proposed solutions may also be applicable to other MAC reset conditions or other procedures which may impact the service continuity of the PC5 interface (e.g., cell (re)selection, Bandwidth Part (BWP) change, and Cell Group change).

TABLE 2

Example of MAC Reset Operation (MAC Reset)

5.12 MAC Reset
If a reset of the MAC entity is requested by upper layers, the MAC entity shall:
  1>initialize Bj for each logical channel to zero;
  1>stop (if running) all timers;
  1>consider all timeAlignmentTimers as expired and perform the corresponding actions in subclause 5.2;
  1>set the New Data Indicator (NDIs) for all UL HARQ processes to the value 0;
  1>stop, if any, ongoing RACH procedure;
  1>discard explicitly signalled contention-free RA Resources, if any;
  1>flush Msg3 buffer;
  1>cancel, if any, triggered Scheduling Request procedure;
  1>cancel, if any, triggered Buffer Status Reporting procedure;
  1>cancel, if any, triggered Power Headroom Reporting procedure;
  1>flush the soft buffers for all DL HARQ processes;
  1>for each DL HARQ process, consider the next received transmission for a TB as the very first transmission;
  1>release, if any, Temporary C-RNTI;
  1>reset Beam Failure Indication (BFI)_COUNTER.

In some implementations, the impact of MAC reset on an ongoing SL operation may be also described in Table 3:

TABLE 3

Impact Analysis of MAC reset to SL operation

| MAC reset | Possible Impacts to NR V2X service |
|---|---|
| initialize Bj for each logical channel to zero; | If logical channel prioritization procedure based on Bj is introduced: Bj of sidelink logical channels may be reset to 0. |
| stop (if running) all timers; | 1) If beam failure recovery procedure is introduced: beamFailureDetectionTimer may be stopped. 2) If beam failure recovery procedure is introduced: beamFailureRecoveryTimer may be stopped. 3) If SL-SR procedure is introduced (and is kept without being impacted by the MAC reset): sr-ProhibitTimer may still be stopped. 4) If SL-BSR procedure is introduced (and is kept without being impacted by the MAC reset): The following timers may still be stopped. a) periodicBSR-Timer; b) retxBSR-Timer; d) delay timer for SR transmission for the corresponding sidelink logical channel (the value is decided by logicalChannelSR-DelayTimer). 5) If SL-PHR procedure is introduced (and is kept without being impacted by the MAC reset): The following timers may still be stopped: a) phr-PeriodicTimer; b) phr-ProhibitTimer. |
| consider all timeAlignmentTimers as expired; | a) The UE may receive a Timing Advance Command through MSG2 reception (e.g., during the SI on-demand procedure) and so the timeAlignmentTimer may be triggered. b) However, with the reset of MAC entity, the timeAlignmentTimer may be considered as expired. c) Based on the spec: 1> when a timeAlignmentTimer expires: 2> if the timeAlignmentTimer is associated with the PTAG: 3> flush all HARQ buffers for all Serving Cells; 3> notify RRC to release PUCCH for all Serving Cells, if configured; 3> notify RRC to release SRS for all Serving Cells, if configured; 3> clear any configured downlink assignments and configured UL grants; 3> clear any PUSCH resource for semi-persistent CSI reporting; 3> consider all running timeAlignmentTimers as expired; 3> maintain NTA of all TAGS. Although sidelink HARQ buffers are not separately |

TABLE 3-continued

Impact Analysis of MAC reset to SL operation

| MAC reset | Possible Impacts to NR V2X service |
|---|---|
| | listed in the spec, we should anyway prevent the sidelink HARQ buffers from being cleared due to TAT expiry. |
| set the NDIs for all UL HARQ processes to the value 0; | To consider the Sidelink HARQ procedure. In some implementations, the sidelink HARQ procedure may also be stopped and the NDI of all sidelink HARQ procedure may be set to 0, which may impact the QoS of NR V2X service. |
| stop, if any, ongoing RACH procedure; discard explicitly signalled ra-PreambleIndex and ra-PRACH-MaskIndex, if any; discard explicitly signalled contention-free RA Resources, if any; flush Msg3 buffer; | If the ongoing RACH procedure is trigged for sidelink (e.g., SL-BSR report), stopping ongoing RACH procedure may impact the sidelink operation. |
| cancel, if any, triggered Scheduling Request procedure; | If NR-V2X service supports Sidelink Scheduling Request (SL-SR) procedure (e.g., platoon member is triggered to send SL-SR to the scheduler in the platoon). Then the SL-SR procedure may be cancelled by this instruction. |
| cancel, if any, triggered Buffer Status Reporting procedure; | If NR-V2X service supports Sidelink Buffer Status Reporting (SL-BSR) procedure (e.g., platoon member is triggered to send SL-BSR to the scheduler in the platoon). Then the SL-BSR procedure may be cancelled by this instruction. |
| cancel, if any, triggered Power Headroom Reporting procedure; | If NR-V2X service supports Sidelink Power Headroom Reporting (SL-PHR) procedure (e.g., platoon member is triggered to send SL-PHR report to the scheduler in the platoon). Then the SL-PHR procedure may be cancelled by this instruction. |
| flush the soft buffers for all DL HARQ processes; | 1) N.A. No direct impact on SL. 2) Maybe we can further indicate that the soft buffers for all SL HARQ processes should not be impacted. |
| for each DL HARQ process, consider the next received transmission for a TB as the very first transmission; | 1) N.A. No direct impact on SL. 2) Maybe we can further indicate that the soft buffers for all SL HARQ processes should not be impacted. |
| release, if any, Temporary C-RNTI. | 1) N.A. No direct impact on SL. |
| reset BFI_COUNTER | 1) If beam failure recovery procedure is introduced: BFI_COUNTER may be reset. |

In some implementations, all (or part of) ongoing operations, on-going procedures, or parameters (but not limited to) for SL may not be impacted when the MAC entity is reset by the Uu interface. The PC5 interface may be an LTE PC5 interface or an NR PC5 interface and the Uu interface may be LTE Uu interface or NR Uu interface.

In some implementations, (part of the) MAC functionalities for the PC5 interface may not be impacted when the MAC entity is reset by the Uu interface. This may be critical especially when the URLLC service is introduced on PC5 interface. In some implementations, (part of) the PC5 interface may be reset with the MAC reset caused by the Uu interface. In addition, in some implementations, some procedures on the Uu interface, such as SL-SR and SL-PHR procedures on the Uu interface, may be cancelled with the MAC reset (e.g., caused by the events included in Table 1) but the corresponding procedures may not be impacted if these procedures are triggered on SL to one UE (e.g., the group leader (or scheduler) in a platoon).

In some implementations, procedures provided below may be used in the MAC layer/entity:

1) Beamforming & beam failure recovery procedure on SL;
2) SL-SR procedure (which may include an SL-SR procedure on the Uu/PC5 interface to support an SL operation with the involvement of a gNB/scheduler);
3) SL-BSR procedure (which may include an SL-BSR procedure on the Uu/PC5 interface to support an SL operation with the involvement of a gNB/scheduler);
4) SL-PHR procedure (which may include an SL-PHR procedure on the Uu/PC5 interface to support an SL operation with the involvement of a gNB/scheduler); and
5) SL-RA procedure (which may include an SL-RA procedure on the Uu/PC5 interface to support SL operation with the involvement of gNB/scheduler).

In addition, operations related to performing these procedures after the MAC layer is reset because of the Uu interface are also provided.

In some implementations, different MAC reset events may have different corresponding actions. For example, if the MAC reset is triggered due to the cell re-selection or Handover (HO) failure, the SL-SR procedure, SL-BSR procedure, SL-PHR procedure, or SL-RA procedure (but not limited to) on the Uu or PC5 interface may be cancelled (e.g., if the corresponding SL-SR configuration, SL-BSR configuration, SL-PHR configuration, or RA configuration is provided by the previous serving cell or new target cell). In another example, if the MAC reset is triggered due to other cases, the SL-SR procedure, SL-BSR procedure, SL-PHR procedure, or SL-RA procedure (but not limited to) on the Uu or PC5 interface may not be cancelled. In some implementations, the MAC reset events may be determined and indicated by the RRC entity (of the UE) directly with specific cause. In some other implementations, the MAC reset events may be determined by the MAC entity (of the UE) with a specific cause provided by the RRC entity.

In some implementations, whether a UE may perform a complete MAC reset or partial MAC reset is based on the concerned V2X services. A complete MAC reset may be defined as shown in Table 2 for both SL operations and normal operations. A partial MAC reset may be defined to only cancel the normal operations, but not to cancel the SL-specific operations (e.g., the SL-SR procedure, SL-BSR procedure, SL-PHR procedure, or SL-RA procedure (but not limited to) on the Uu/PC5 interface). For example, a UE with the URLLC V2X service may be configured or mandatorily perform a partial MAC reset when a MAC reset event is triggered. For example, a UE with the eMBB V2X service may be configured or mandatorily perform a complete MAC reset.

In some implementations, whether a UE may perform a complete MAC reset or partial MAC reset is based on the received SL configuration(s). For example, if the SL configuration is received from the serving gNB, a UE may perform a complete MAC reset when a MAC reset event is triggered. For example, the UE may not release or clear the SL configuration when a MAC reset event (caused by the Uu interface) is triggered (and so it may become a partial MAC reset) if the received SL configuration comes from another UE (e.g., a scheduler UE). In some additional procedures, the UE may also not release or clear the SL configuration if the UE obtains the SL configuration through a pre-configuration.

In some implementations, whether to perform a partial MAC reset or a complete MAC reset may be indicated by the information provided by the serving gNB or the target UE (e.g., the scheduler UE).

SL Beamforming and Beam Failure Detection

In the NR V2X service, a beamforming operation may also be introduced in the PC5 interface.

Figure 3:
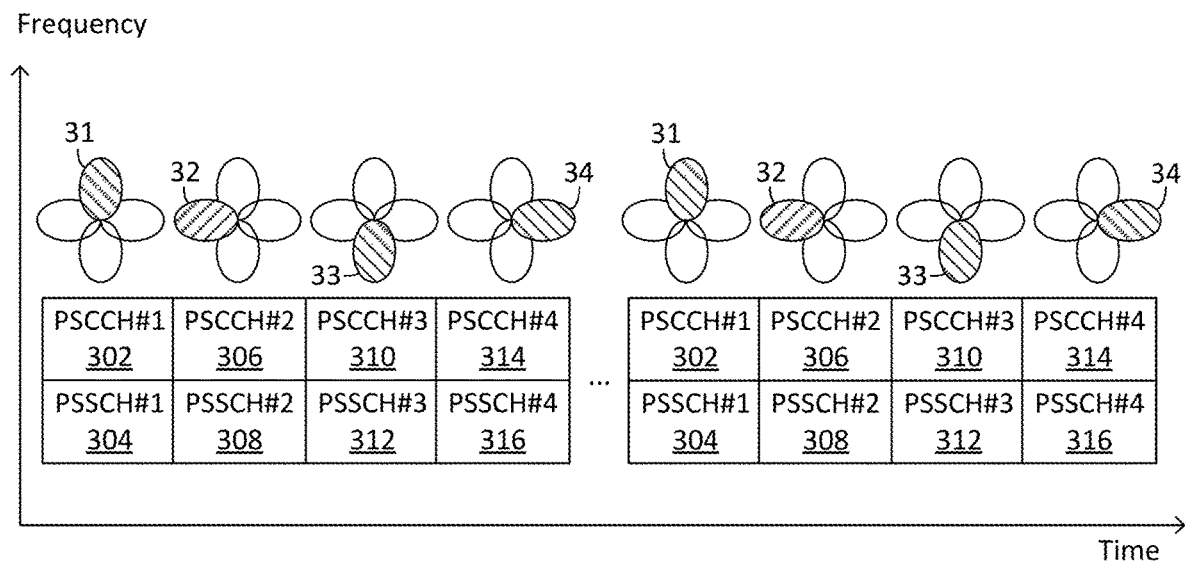
FIG. 3 is a schematic diagram illustrating a beamforming operation in SL, in accordance with an example implementation of the present application.

FIG. 3 is a schematic diagram illustrating a beamforming operation in SL, in accordance with an example implementation of the present application. As shown in FIG. 3, different SL-resources (e.g., SL-resource pools) may be configured with different beams (e.g., Physical Sidelink Control Channel (PSCCH) #1 302 and Physical Sidelink Shared Channel (PSSCH) #304 may be configured with beam 31, PSCCH #2 306 and PSSCH #2 308 may be configured with beam 32, PSCCH #3 310 and PSSCH #3 312 may be configured with beam 33, and PSCCH #4 314 and PSSCH #4 316 may be configured with beam 34) and so one transmitter UE may transmit one or more than one SL Control Information (SCI) with corresponding SL packet(s) on the associated beam direction to one corresponding receiver UE.

In some implementations, in the SL beamforming operation, each beam (e.g., beam 31, 32, 33 and 34) may be associated with one SL reference signal (e.g., an SL-Synchronization Signal Block/Burst (SL-SSB) or a Demodulation Reference Signal (DMRS)) in the PC5 interface. In some implementations, each beam may be associated one corresponding Transmission Configuration Indicator (TCI) state in control singalongs design. Therefore, the receiver UE may monitor the channel quality of each corresponding by monitoring and estimating the associated SL reference signal. In some implementations, the receiver UE may also provide feedback information to the transmitter UE about the UE's prefer beam direction and/or related information (e.g., the SL TCI state). In some implementations, the transmitter UE may configure the monitoring SL-SSB(s) to the receiver UE for the beam failure detection and recovery procedure. For example, if the configured monitoring quality(ies) of SL-SSB(s) for the beam failure detection and recovery procedure does not satisfy a pre-configured threshold, the Physical (PHY) layer of a (receiver) UE may indicate an SL-beam failure instant indicator to the upper layer of the UE (e.g., the MAC layer).

In some implementations, to maintain the SL beamforming operation, the receiver UE may also be configured (e.g., by the RRC signaling from the RAN through the Uu interface, or by the SL RRC signaling from another UE, such as the scheduler UE in a platoon, through the PC5 interface) with a beam failure recovery procedure which is used for indicating to the transmitter UE of an SL reference signal (e.g., a new SL Synchronization Signal Burst, a Channel State Information-Reference Signal (CSI-RS), or a DMRS in the PC5 interface) when many beam failure indications are detected on the serving SL reference signal.

As shown in Table 4, the PHY layer (on the PC5 interface) may deliver 'SL-beam failure instance indication' to the MAC layer when the PHY layer detects that the serving beam quality with one associated serving SL reference signal is poor (e.g., the Reference Signal Received Power (RSRP) of the corresponding SL reference signal is lower than a pre-defined threshold). After the UE receiving one SL-beam failure instance indication from the PHY layer, the UE may start or restart a beam failure detection timer (beamFailureDetectionTimer) to a pre-defined value (e.g., beamFailureDetectionPeriod) and then run the beamFailureDetectionTimer until expiry. The receiver UE may keep aggregating the number of SL-beam failure instance indications by incrementing the value of a Beam Failure Indication (BFI) counter (e.g., BFI_COUNTER) by 1 every time the MAC entity receives an SL-beam failure instance indication while the beamFailureDetectionTimer is running. The receiver UE may initiate an SL beam failure recovery procedure with the transmitter UE if the BFI_COUNTER is equivalent or larger than a pre-defined threshold (e.g., the beamFailureInstanceMaxCount in Table 4) before the beamFailureDetectionTimer expires.

In some implementations, the UE may reset the BFI_COUNTER (e.g., to zero) and beamFailureDetectionTimer (e.g., to the beamFailureDetectionPeriod) if the BFI_COUNTER is lower than the beamFailureInstanceMaxCount while the beamFailureDetectionTimer expires. In some implementations, the parameters of beamFailureDetectionTimer and beamFailureInstanceMaxCount may be configured for the SL operations in the PC5 interface and the Uu interface, separately. In some implementations, the UE may be configured with both (1) a dedicated SL resource (e.g., an SL reference signal and/or a physical SL resource in the frequency/time domain), and (2) a common SL resource, for the SL beam failure recovery procedure.

The dedicated SL resource may be specific to the receiver UE and so the transmitter UE may recognize the receiver UE directly after the receiver UE transmits a beam failure recovery indication (e.g., via a preamble, a MAC Control Element (CE) or a signaling on the PSCCH/Physical Sidelink Feedback Channel (PSFCH)) through the dedicated SL resource to the transmitter UE for the SL beam failure recovery procedure. Further signaling exchange between the transmitter UE and the receiver UE may be needed if the receiver UE applies the common SL resource to the transmitter UE for the SL beam failure recovery procedure.

In some implementations, a timer (e.g., beamFailureRecoveryTimer) may be provided with a dedicated SL resource to the UE. The beamFailureRecoveryTimer may be triggered (or started) while the UE initiates an SL beam failure recovery procedure. Then, the UE may be allowed to apply the dedicated SL resource (only) when the beamFailureRecoveryTimer is still running. In contrast, the UE may be not allowed to perform the SL beam failure recovery procedure on the dedicated SL resource after the beamFailureRecoveryTimer expires.

tions, if an SL-RA problem is received from the lower layer (e.g., the MAC layer), the UE may report SL-RA failure information via the Uu interface to the network. In some implementations, if an SL-RA problem is received from the lower layer (e.g., the MAC layer), transmission on the dedicated SL resources or common SL resources may be suspended. In some implementations, if an SL-RA problem is received from the lower layer (e.g., the MAC layer), the dedicated SL resources or common SL resources may be released.

TABLE 4

MAC entity may trigger beam failure recovery procedure based on the counting result of BFI_COUNTER before the beamFailureDetectionTimer expires The MAC entity shall:
1>if SL-beam failure instance indication has been received from lower layers:
  2>start or restart the beamFailureDetectionTimer;
  2>increment BFI_COUNTER by 1;
  2>if BFI_COUNTER >= beamFailureInstanceMaxCount:
    3>initiate a sidelink beam failure recovery procedure.
1>if the beamFailureDetectionTimer expires; or
1>if beamFailureDetectionTimer, beamFailureInstanceMaxCount, or any of the sidelink reference signals used for beam failure detection is reconfigured by upper layers:
  2>set BFI_COUNTER to 0.
1>if the sidelink beam failure recovery procedure is successfully completed:
  2>set BFI_COUNTER to 0;
  2>stop the beamFailureRecoveryTimer, if configured;
  2>consider the sidelink beam failure recovery procedure successfully completed.

Figure 4:
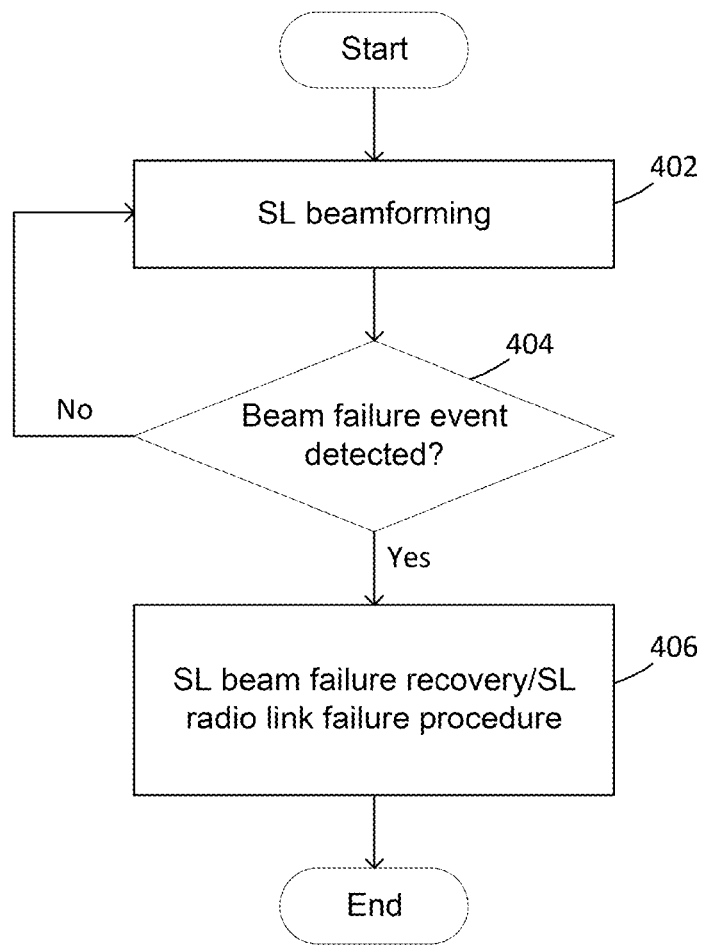
FIG. 4 is a flowchart of a procedure by a UE for SL beamforming, in accordance with an example implementation of the present application.

FIG. 4 is a flowchart of a procedure by a UE for SL beamforming, in accordance with an example implementation of the present application. In the example implementation, the UE may maintain an SL beamforming operation with an associated (Layer-2) ProSe destination (e.g., a target UE or a group of UEs). In addition, in a UE, multiple independent SL beamforming operations may co-exist with different associated ProSe destinations. In addition, in some implementations, the UE may trigger an SL Radio Link Failure (SL-RLF) event if the SL beam failure event has been detected based on the counting result of the BFI_COUNTER (e.g., the BFI_COUNTER counting in Table 4). Moreover, the UE may forward the SL-RLF event to the upper layers (e.g., the V2X layer) after the SL beam failure event is triggered.

As shown in FIG. 4, in action 402, a (receiver) UE may perform at least one SL beamforming operation. In action 404, the UE may determine whether a beam failure event is detected (e.g., based on the counting result of the BFI_COUNTER). If the beam failure event is detected, in action 406, the UE may proceed to perform an SL beam failure recovery and/or SL RLF procedure. Conversely, if the outcome of action 404 is No, the UE may continue with the SL beamforming operation.

In some implementations, the (receiver) UE may initiate an SL-RA procedure to re-synchronize with the (transmitter) UE for beam failure recovery if the SL beam failure event has been detected. If the initiated SL-RA procedure to re-synchronize with the (transmitter) UE for beam failure recovery is considered as unsuccessful, the MAC layer of the (receiver) UE may indicate an SL-RA problem to the upper layer(s). In some implementations, the MAC layer may indicate to the upper layer(s) that this SL-RA problem is caused by an SL-beam recovery failure (e.g., by referring to the beam failure detection procedure in SL). In some implementations, if an SL-RA problem is received from the lower layer (e.g., the MAC layer), the upper layer(s) may not initiate a re-establishment procedure. In some implementa- In some implementations, a UE may have multiple SL connections (e.g., SL unicast connections in Access Stratum (AS) layer) with different ProSe destinations, where each ProSe destination may be composed by a UE (e.g., for SL unicast) or a group of UEs (e.g., for SL multi-cast or SL broadcast). In addition, the UE may have independent beamforming operations to different destinations. Therefore, the MAC entity in the UE side may also need to perform independent SL beam failure detection(s) and beam failure recovery procedure(s) to one or more ProSe destinations in the PC5 interface. The SL communications may cover the in-coverage scenario, the out-of-coverage scenario, and the partial-coverage scenario (e.g., by referring the coverage of RAN nearby the UE(s)).

However, based on the impact analysis, the beam failure recovery procedure may be interrupted when the MAC entity is reset. Therefore, in some implementations, the MAC reset should not impact the SL beam failure recovery procedure when the MAC entity is reset by one or more events summarized in Table 5.

TABLE 5

Proposed solution(s) for SL beam failure recovery (detection) procedure

| Original implementation (TS 38.321) | Proposals |
|---|---|
| stop (if running) all timers; | 1) Keep beamFailureDetectionTimer beamFailureRecoveryTimer for SL-beam failure and recovery procedure on PC5 interface without being impacted by the MAC reset (to all of the ProSe destinations with beamforming operations). |
| reset BFI_COUNTER | 1) Keep BFI_COUNTER for SL-beam failure and recovery procedure on PC5 interface without being impacted by the MAC reset (to all of the ProSe destinations with beamforming operations). |

SL-SR/SL-BSR/SL-PHR Procedure

In some implementations, the SL-SR/SL-BSR/SL-PHR procedures may be implemented on the Uu interface and/or PC5 interface, where:

the SL-SR procedure may include an SL-SR procedure on the Uu/PC5 interface to support SL operations with the involvement of a gNB/scheduler, the SL-BSR procedure includes an SL-BSR procedure on the Uu/PC5 interface to support SL operations with the involvement of a gNB/scheduler, and the SL-PHR procedure may include an SL-PHR procedure on the Uu/PC5 interface to support SL operations with the involvement of a gNB/scheduler.

In some implementations, the SL-SR/SL-BSR/SL-PHR procedure may be released with a MAC reset or an SL AS level RLF events (e.g., SL beam failure event). However, to enhance the robustness of SL connections, in some implementations, the SL-SR/SL-BSR/SL-PHR procedure may not be impacted by the MAC reset when certain conditions are met.

Figure 5:
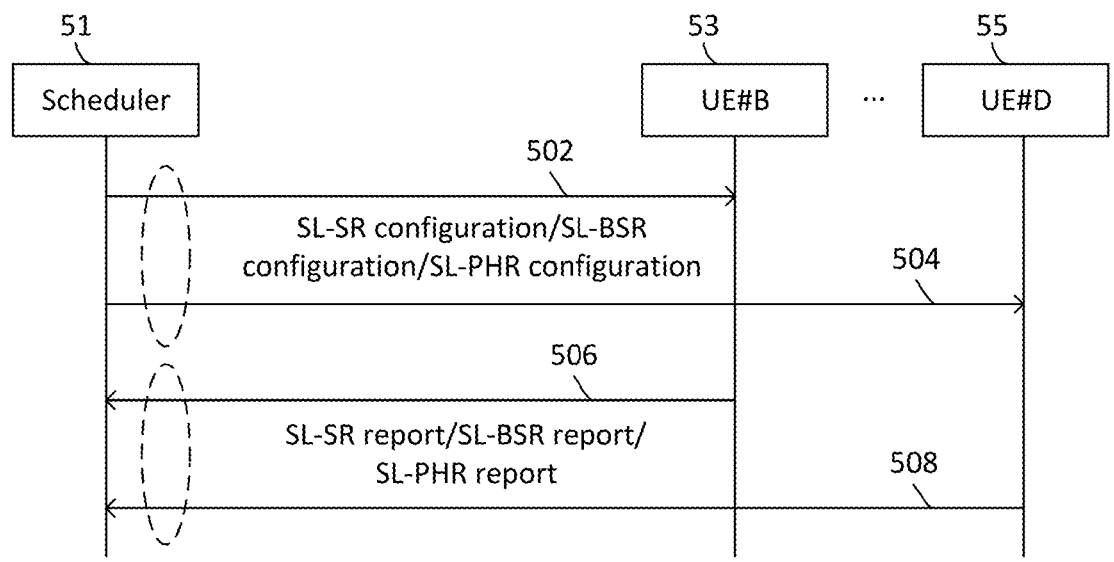
FIG. 5 is a sequence diagram illustrating an exchange of messages among members in a platoon, in accordance with an example implementation of the present application.

Signaling Flow (a) Scenario 1: FIG. 5 is a sequence diagram illustrating an exchange of messages among members in a platoon, in accordance with an example implementation of the present application. As shown in FIG. 5, the receiver UEs (e.g., UE #B 53 and UE #D 55) may receive (any combination of) SL-SR/SL-BSR/SL-PHR configuration(s) from scheduler 51 in the platoon through the PC5 interface in actions 502 and 504. Then, the receiver UEs (e.g., UE #B 53 and UE #D 55) may transmit SL-SR/SL-BSR/SL-PHR reports to scheduler 51 through the PC5 interface in actions 506 and 508. In some implementations, the SL-SR/SL-BSR/SL-PHR configuration may be configured by scheduler 51 directly or by the serving RAN. For example, the serving RAN may deliver the SL-SR/SL-BSR/SL-PHR configurations to scheduler 51 through the Uu interface, and then scheduler 51 may relay the received SL-SR/SL-BSR/SL-PHR configurations from the serving RAN to the receiver UEs (e.g., UE #B 53 and UE #D 55) through the PC5 interface.

Figure 6:
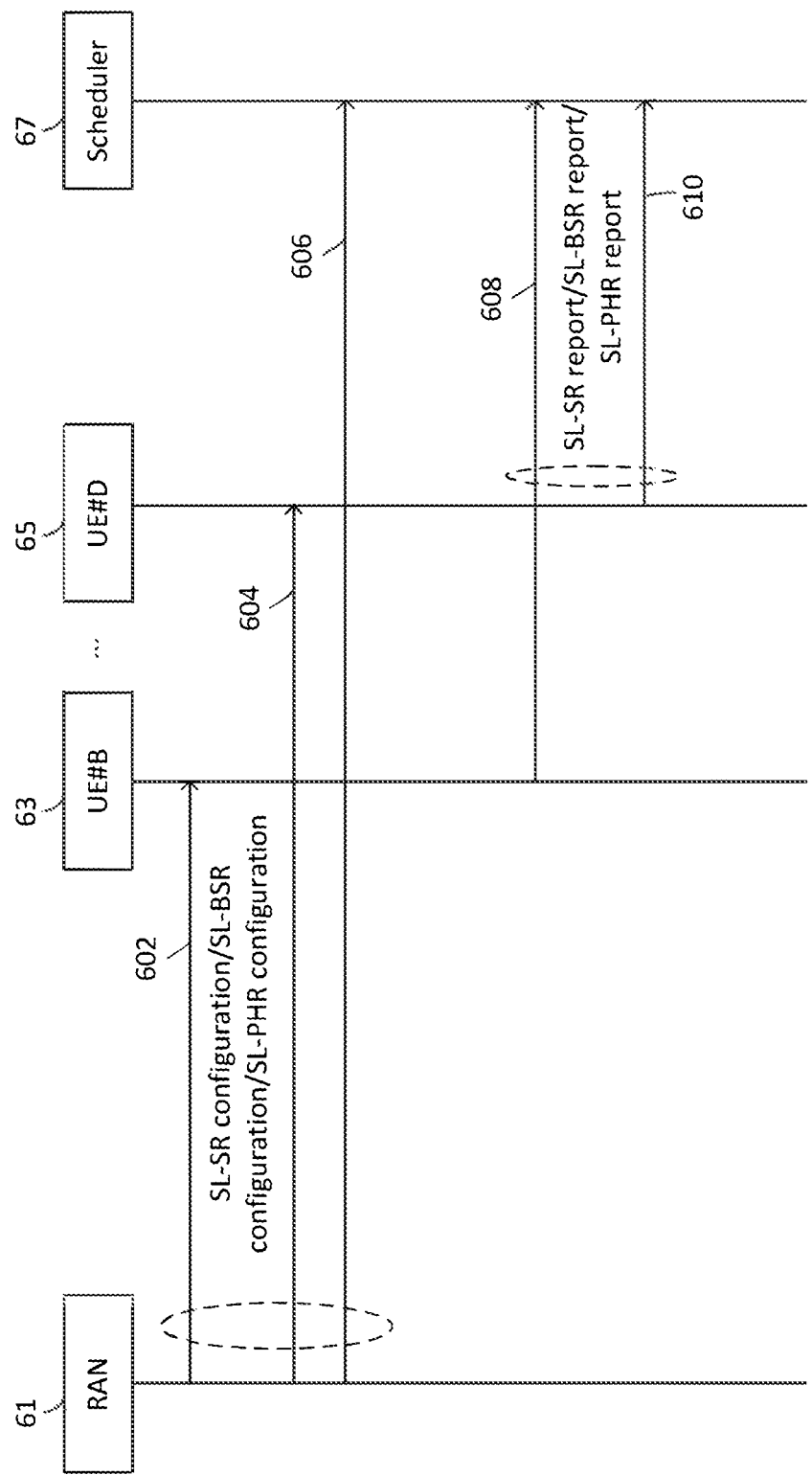
FIG. 6 is a sequence diagram illustrating an exchange of messages among members in a platoon and a (serving) Radio Access Network (RAN), in accordance with an example implementation of the present application.

(b) Scenario 2: FIG. 6 is a sequence diagram illustrating an exchange of messages among members in a platoon and a (serving) RAN, in accordance with an example implementation of the present application. In the example implementation, all the members in the platoon, which may or may not include a scheduler, may receive (any combination of) SL-SR/SL-BSR/SL-PHR configuration(s) from the serving RAN (e.g., from a serving cell configured by a gNB) through the Uu interface. As shown in FIG. 6, in actions 602, 604 and 606, the receiver UEs (e.g., UE #B 63 and UE #D 65) and the scheduler UE (e.g., scheduler 67) may receive (any combination of) SL-SR/SL-BSR/SL-PHR configuration(s) from RAN 61. For example, (the serving cell of) RAN 61 may deliver the SL-SR/SL-BSR/SL-PHR configurations by dedicated control signaling (e.g., RRC signaling such as RRCConnectionReconfiguration message in a unicast manner or groupcast manner) or through broadcasting message (e.g., through system information). In actions 608 and 610, after receiving the SL-SR/SL-BSR/SL-PHR configurations from serving RAN 61, the receiver UEs (e.g., UE #B 63 and UE #D 65) in the platoon may transmit the SL-SR/SL-BSR/SL-PHR report(s) to scheduler 67 in the platoon.

Figure 7:
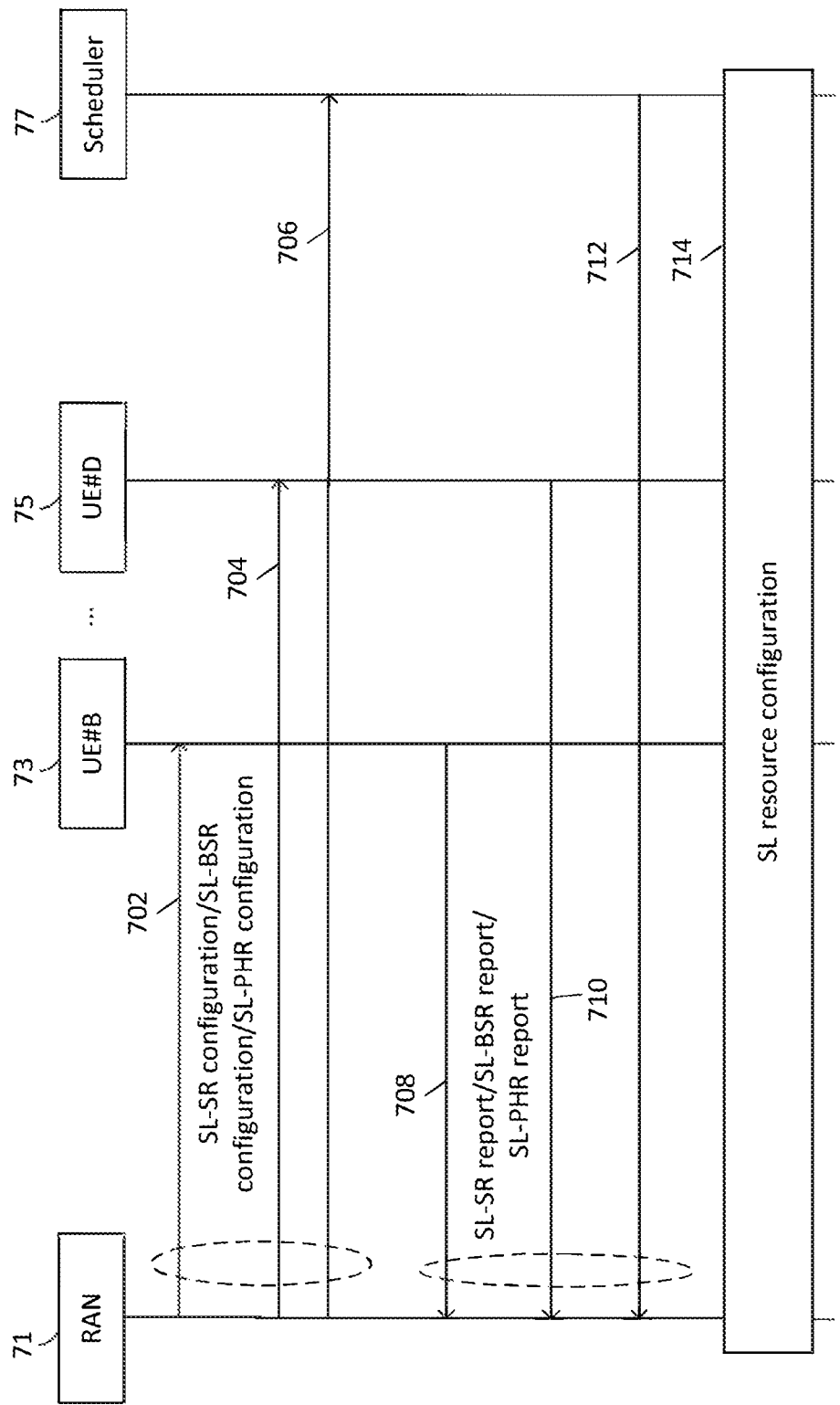
FIG. 7 is a sequence diagram illustrating an exchange of messages among members in a platoon and a (serving) RAN, in accordance with an example implementation of the present application.

(c) Scenario 3: FIG. 7 is a sequence diagram illustrating an exchange of messages among members in a platoon and a (serving) RAN, in accordance with an example implementation of the present application. In the example implementation, the SL-SR/SL-BSR/SL-PHR configuration(s) may be configured and implemented through the Uu interface. As shown in FIG. 7, (the serving gNB of) RAN 71 of the platoon may transmit (any combinations of) SL-SR/SL-BSR/SL-PHR configuration(s) through dedicated control signaling (e.g., RRC signaling, such as the RRCConnectionReconfiguration message) to each member in the platoon (e.g., UE #B 73, UE #D 75 and scheduler 77) in actions 702, 704 and 706. In some implementations, the member(s) of the platoon may not include a scheduler. Then, in actions 708, 710 and 712, the members in the platoon (e.g., UE #B 73, UE #D 75 and scheduler 77) may transmit SL-SR/SL-BSR/SL-PHR report(s) to RAN 71 through the Uu interface based on the received SL-SR/SL-BSR/SL-PHR configurations. Then, in action 714, RAN 71 may provide SL resource configuration(s) (Mode 1 or Mode 2) to the members in the platoon (e.g., UE #B 73, UE #D 75 and scheduler 77) based on the received SL-SR/SL-BSR/SL-PHR report(s). Moreover, the members in the platoon may provide SL-SR (e.g., through the same PUCCH with UL-SR or another specific UL resource in the Uu interface for SL-SR), or SL-BSR (e.g., through a PUSCH), or SL-PHR (e.g., through a PUSCH)) to the serving gNB in RAN 71.

(d) Scenario 4: In some implementations, a UE may receive an SL-SR/SL-BSR/SL-PHR configuration configured by a scheduler through the PC5 interface. Then, the UE may provide an SL-SR/SL-BSR/SL-PHR report to the serving cell through the Uu interface.

In some implementations, the platooning scenario may cover various traffic types such as unicast, group-cast, and broadcast.

SL-SR Procedure

Based on the LTE V2X protocols, a UE may trigger an SR if a regular SL BSR has been triggered and no UL grant is configured (or available). In addition, the same PUCCH configuration may be applied to the SR procedure that is triggered by the SL-BSR and the SR procedure triggered by the Uu interface traffics.

In some implementations, the SL-SR procedure may include an SL-SR procedure on the Uu interface (e.g., the UE triggers an SL-SR procedure to a BS in the RAN) and/or an SL-SR procedure on the PC5 interface (e.g., the UE triggers an SL-SR procedure to another UE, which may be the scheduler in the same platoon).

In some implementations, the SL-SR configuration may be configured with a set of UL resources for the UE to provide the SL-SR to the serving RAN (e.g., the master node or the secondary node in the dual-connectivity scenario) through the Uu interface. In addition, in some implementations, the UL resource for SL-SR may be different from the UL resource for UL-SR.

In some implementations, for an SL logical channel, the serving gNB may configure an SL-SR resource on the Uu interface by at least one of the following approaches:

(a) Through one or more specific SL-SR resource configurations, which is(are) dedicated to the SL logical channel. Also note the one or more specific SL-SR resource configurations may not be the same with any other UL-SR resource configuration.

(b) No specific SL-SR resource but a common SL-SR resource (which may be shared with other SL logical channel(s)). Also note the shared SL-SR resource configuration(s) may not be the same with any other UL-SR resource configuration.

(c) No specific SL-SR resource, and the SL-SR is also provided through a common UL-SR resource shared with other UL logical channel.

(d) No resource is configured for the SL-SR of the SL logical channel. Therefore, the UE may need to initiate an RA procedure with the serving gNB to report the SL-BSR related to the SL logical channel.

In some implementations, an SL-SR configuration may be configured with a set of SL resources (e.g., a PSFCH(s)) for the UE to provide an SL-SR to another UE (e.g., the scheduler in a platoon) through the PC5 interface. The PSFCH may be a set of continuous physical resources on the PC5 interface for a UE to provide data or control signaling to another UE (e.g., the scheduler in a platoon).

In some implementations, different SL-SR configurations (e.g., different SL-SR parameters shown in Table 6) may be configured for each ProSe destination (e.g., a UE in the unicast scenario, or a group of UEs in the group-cast scenario) independently.

In some implementations, a UE may be configured with SL-SR configurations on the Uu interface and SL-SR configurations on the PC5 interface, for different ProSe destinations.

In some implementations, there may also be one or more than one SL logical channel to each ProSe destination. The MAC entity may be configured with zero, one, or more than one SL-SR configuration. To a logical channel, at most one SL-SR configuration may be configured per BWP basis. So, different SL-SR configurations may be configured to different logical channels in different BWPs on the Uu/PC5 interface.

In some implementations, if the MAC entity has no valid PUCCH/PSFCH resource configured for the pending SL-SR, the UE may initiate an RA procedure on the Special Cell (SpCell) and cancel the pending SL-SR. In other implementations, if the MAC entity has no valid PUCCH/PSFCH resource configured for the pending SL-SR, the UE may initiate an SL-RA procedure to the target UE (e.g., the scheduler) on the PC5 interface and cancel the pending SL-SR.

Examples of detailed parameters and the related UE behavior of the SL-SR procedure are shown in Table 6.

TABLE 6

Parameters and UE behavior for SL-SR

| SL-SR configuration | Note |
| --- | --- |
| sr-ProhibitTimerSL (per SL-SR configuration) | (1) sr-ProhibitTimerSL = ENUMERATED {ms1, ms2, ms4, ms8, ms16, ms32, ms64, ms128}. Timer for SL-SR transmission on associated physical resource, value in ms.<br>(2) When an SL-SR is triggered, it shall be considered as pending until it is cancelled. All pending SL-SR(s) triggered prior to the MAC PDU assembly shall be cancelled and each respective sr-ProhibitTimerSL shall be stopped when the MAC PDU is transmitted and this PDU includes a Long or Short SL-BSR MAC CE which contains buffer status up to (and including) the last event that triggered an SL-BSR prior to the MAC PDU assembly.<br>(3) All pending SL-SR(s) shall be cancelled and each respective sr-ProhibitTimerSL shall be stopped when the sidelink grant(s) can accommodate all pending data available for transmission.<br>(4) If there is valid associated physical resource to one pending SL-SR, the MAC entity may start sr-ProhibitTimerSL if SR_COUNTERSL < sr-TransMaxSL. |
| sr-TransMaxSL (per SL-SR configuration) | sr-TransMax = ENUMERATED {n4, n8, n16, n32, n64, spare3, spare2, spare1}; Maximum number of SL-SR transmissions. n4 corresponds to 4, n8 corresponds to 8, and so on. |
| SR_COUNTERSL (per SL-SR configuration) | (1) If an SL-SR is triggered and there are no other SL-SRs pending corresponding to the same SL-SR configuration, the MAC entity shall set the SR_COUNTERSL of the corresponding SR configuration to 0.<br>(2) If there is valid associated physical resource to one pending SL-SR, the MAC entity may increment SR_COUNTERSL by 1 if SR_COUNTERSL < sr-TransMaxSL.<br>(3) If more than one individual SL-SR triggers an instruction from the MAC entity to the PHY layer to signal the SL-SR on the same valid associated resource, the SR_COUNTERSL for the relevant SL-SR configuration is incremented only once. |

Based on the proposed SL-SR procedure, the SL-SR procedure may not be cancelled by the MAC reset at least in some conditions (e.g., depending on the associated resource), as shown in Table 7.

TABLE 7

Proposals to SL-SR Procedure to MAC Reset

| MAC reset | Proposals |
| --- | --- |
| stop (if running) all timers; | 1) If an SL-SR procedure is introduced: sr-ProhibitTimerSL should not be stopped with the MAC reset.<br>In some implementations:<br>a) If the SL-SR configuration is associated with a PUCCH resource, then the sr-ProhibitTimerSL may be stopped with the MAC reset.<br>b) If the SL-SR configuration is associated with a PSFCH resource, then the sr-ProhibitTimerSL may not be stopped with the MAC reset. |
| cancel, if any, triggered Scheduling Request procedure; | If an SL-SR procedure is introduced: the triggered SL-SR procedure should not be cancelled with the MAC reset.<br>In some implementations:<br>a) If the SL-SR configuration is associated with a UL resource (e.g., PUCCH), then the triggered SL-SR procedure may be cancelled with the MAC reset.<br>b) If the SL-SR configuration is associated with a |

TABLE 7-continued

Proposals to SL-SR Procedure to MAC Reset

| MAC reset | Proposals |
|---|---|
| | sidelink resource (e.g., PSFCH, PSCCH), then the triggered SL-SR procedure may not be cancelled with the MAC reset.<br>Therefore, SL-SR procedures for different ProSe destinations may be treated differently depending on whether the SL-SR procedure is configured (or triggered) on the Uu interface or PC5 interface for one or more ProSe destinations. In addition, an SL-SR procedure may not be cancelled if the MAC reset does not apply to all ProSe destinations associated with the SL-SR procedure.<br>In some implementations:<br>Whether SL-SR configurations may/may not be cancelled may be based on different cast-types for each ProSe destination on the PC5 interface. For example,<br>a) SL-SR procedures for unicast V2X service may not be cancelled with the MAC reset.<br>b) In contrast, SL-SR procedures for broadcast/group-cast V2X service may be cancelled with the MAC reset.<br>In some implementations, whether SL-SR configurations may/may not be cancelled may be based on different scenarios, as shown in FIG. 5, FIG. 6, or FIG. 7. For example, if the SL-SR configuration is provided by the serving gNB, the corresponding SL-SR procedure may be cancelled with the MAC reset. For example, if the SL-SR configuration is provided by a scheduler or pre-configuration, the corresponding SL-SR procedure may not be cancelled with the MAC reset. This concept may also be applicable to other sidelink procedures configured by the scheduler/pre-configuration.<br>In some other implementations, the SL-SR procedures and the radio resources for SL-SR (e.g., on the Uu interface) may be treated with the following approaches:<br>a) the SL-SR procedure may be cancelled & SL-SR radio resource may be released with the MAC reset.<br>b) the SL-SR radio resource may be released with the MAC reset but the SL-SR procedure may not be cancelled. In this case, the UE may initiate an RA procedure in the Uu interface for SL-SR procedure. Alternatively, the UE may initiate an SL-RA procedure on the PC5 interface to the target UE (e.g., the scheduler).<br>c) the SL-SR procedures may be cancelled with the MAC reset but the SL-SR resource may not be cancelled. Therefore, the UE may initiate an SL-SR procedure soon without requesting a new UL resource. |

SL-BSR Procedure

In some implementations, an SL-BSR procedure may include an SL-BSR procedure on the Uu interface (e.g., the UE reports an SL-BSR to a BS in the RAN) and/or an SL-BSR procedure on the PC5 interface (e.g., the UE reports an SL-BSR to another UE, which may be the scheduler in the same platoon). In addition, the SL-BSR configurations in the Uu interface and the PC5 interface may be different.

In some implementations, in the Uu interface, the "Regular SL BSR"/"Periodic SL BSR"/"Padding SL BSR" may be supported as LTE SL protocols (e.g., introduced in the 3GPP TS 36.321.f.4.0).

In some implementations, in the PC5 interface, the "Regular SL BSR"/"Periodic SL BSR"/"Padding SL BSR" may be supported in the PC5 interface. In some implementations, the BS may configure SL physical resources (e.g., PSFCH(s) or PSSCH(s) on the SL resource pools or dedicated SL resources) for the UEs to report an SL-BSR. In some implementations, another UE (e.g., a scheduler in the same platoon with the UE) may configure SL physical resources (e.g., PSFCH(s) or PSSCH(s) on the SL resource pools or dedicated SL resources) for the UE to report the SL-BSR. The UE may transmit the SL-BSR based on the SL grant that is obtained based on the Mode 1-like approach or Mode 2-like approach.

In some implementations, (part of) the SL-BSR configurations on the Uu interface and the PC5 interface may be the same. In some other implementations, the SL-BSR configurations on the Uu interface and the PC5 interface may be different.

In some implementations, a truncated SL-BSR may be supported in the Uu interface and/or the PC5 interface. In the Uu interface, UE may multiplex and assemble the truncated SL-BSR with UL data. Then, the multiplexed UL packet may be transmitted in a PUSCH. In the PC5 interface, the UE may multiplex and assemble the truncated SL-BSR with SL data. Then, the multiplexed SL packet may be transmitted in a PSSCH or a PSFCH.

In some implementations different SL-BSR configurations may be provided to a UE for each ProSe destination (e.g., a UE in the unicast scenario, or a group of UEs in the group-cast scenario) independently. In addition, a UE may be configured with both SL-BSR configuration on the Uu interface and SL-BSR configuration on the PC5 interface (e.g., for different ProSe destinations).

Examples of detailed parameters of an SL-BSR procedure are shown in Table 8.

TABLE 8

Parameters and UE behavior for SL-BSR

| SL-BSR configuration | Note |
|---|---|
| periodicBSR-TimerSL | Timer for periodic BSR reporting (e.g., as shown in TS 36.321.f.4.0) |
| retxBSR-TimerSL | Timer for regular BSR reporting (e.g., as shown in TS 36.321.f.4.0) |
| logicalChGroupInfoList | Indicates for each logical channel group the list of associated priorities (e.g., as specified in TS 36.321.f.4.0) |
| logicalChannelSR-DelayTimerAppliedSL | (1) logicalChannelSR-DelayTimerAppliedSL = Boolean {true, false}<br>(2) Each sidelink logical channel may be configured with logicalChannelSR-DelayTimerApplied independently.<br>(3) Indicates whether to apply the delay timer for SL-SR transmission.<br>For example:<br>"For Regular SL-BSR, the MAC entity shall:<br>1> if the SL-BSR is triggered for a logical channel for which logicalChannelSR-DelayTimerAppliedSL is configured by upper layers:<br>2> start or restart the logicalChannelSR-DelayTimerSL.<br>1> else:<br>2> if running, stop the logicalChannelSR-DelayTimerSL."<br>(in PC5 interface or Uu interface) for one logical channel, this parameter may be set to FALSE if logicalChannelSR-DelayTimer is not included in SL-BSR configuration. |
| logicalChannelSR-DelayTimerSL | (1) logicalChannelSR-DelayTimerSL = ENUMERATED {sf20, sf40, sf64, sf128, sf512, sf1024, sf2560, spare1}, value in number of subframes. sf1 corresponds to one subframe, sf2 corresponds to 2 subframes, and so on.<br>(2) logicalChannelSR-DelayTimerSL may be configured per MAC entity with independent values for SL-BSR PC5 interface and Uu interface respectively.<br>(3) UE may decide to trigger an SL-SR procedure if a regular SL-BSR has been triggered and logicalChannelSR-DelayTimer is not running (e.g., as the logicalChannelSR-DelayTimer in TS 38.321 in Uu interface) |
| logicalChannelSR-MaskSL | (1) logicalChannelSR-MaskSL = BOOLEAN {true, false}<br>(2) Each sidelink logical channel may be configured with logicalChannelSR-MaskSL independently.<br>(3) Controls SL-SR triggering (in Uu interface or PC5 interface) when a configured sidelink grant (e.g., configured by RRC signaling) is configured (logicalChannelSR-MaskSL = true). (e.g., as the logicalChannelSR-Mask in TS 38.321 in Uu interface) |

Therefore, based on the proposed SL-BSR procedure, the SL-BSR procedure(s) on the Uu interface and/or the PC5 interface may not be cancelled with the MAC reset, as shown in Table 9.

TABLE 9

Proposals to SL-BSR Procedure to MAC Reset

| MAC reset | Proposals |
|---|---|
| stop (if running) all timers; | 1) If an SL-BSR procedure is introduced: periodicBSR-TimerSL, retxBSR-TimerSL and/or logicalChannelSR-DelayTimerSL should not be stopped with the MAC reset.<br>In some additional implementations: |

TABLE 9-continued

Proposals to SL-BSR Procedure to MAC Reset

| MAC reset | Proposals |
|---|---|
| cancel, if any, triggered Buffer Status Reporting procedure; | a) If the SL-BSR configuration is associated with a UL resource (e.g., PUCCH, PUSCH), then the SL-BSR timers procedures may be stopped with the MAC reset.<br>b) If the SL-BSR configuration is associated with a sidelink resource (e.g., PSSCH, PSFCH, PSCCH), then the SL-BSR timers may not be stopped with the MAC reset.<br>1) If an SL-BSR procedure is introduced: the triggered SL-BSR procedure should not be cancelled with the MAC reset and so the stored SL-BSR configuration is also stored on the UE side (e.g., in the UE context).<br>2) The SL-BSR procedure may not be cancelled.<br>In some additional implementations:<br>a) If the SL-BSR configuration is associated with a UL resource (e.g., PUCCH), then the triggered SL-BSR procedure may be cancelled with the MAC reset.<br>b) If the SL-BSR configuration is associated with a sidelink resource (e.g., PSFCH, PSCCH), then the triggered SL-BSR procedure may not be cancelled with the MAC reset.<br>Therefore, SL-BSR procedures for different ProSe destinations may be treated differently depending on whether the SL-BSR procedure is configured (or triggered) on the Uu interface or PC5 interface for one or more ProSe destinations. In addition, an SL-BSR procedure may not be cancelled if the MAC reset does not apply to all ProSe destinations associated with the SL-BSR procedure.<br>In some additional implementations:<br>Whether SL-BSR configurations may/may not be cancelled may be based on different cast-types for each ProSe destination on the PC5 interface. For example,<br>a) SL-BSR procedures for unicast V2X service may not be cancelled with the MAC reset.<br>b) In contrast, SL-BSR procedures for broadcast/group-cast V2X service may be cancelled with the MAC reset.<br>In some implementations, whether SL-BSR configurations may/may not be cancelled may be based on different scenarios, as shown in FIG. 5, FIG. 6 or FIG. 7. For example, if the SL-BSR configuration is provided by the serving gNB, the corresponding SL-BSR procedure may be cancelled with the MAC reset. For example, if the SL-BSR configurations is provided by a scheduler or by pre-configuration, the corresponding SL-BSR procedure may not be cancelled with the MAC reset. |

SL-PHR Procedure

To support SL operation transmissions (e.g., on a PSSCH/PSCCH/PSFCH) in dedicated carriers or active BWP(s), a UE may need to provide SL power headroom information of SL physical channels (e.g., an SL-PHR to the serving BS through Uu interface) to the serving BS or another UE (e.g., an SL-PHR to the scheduler of the same platoon through the PC5 interface). Therefore, the serving BS or the scheduler may arrange SL physical resources to the UE (e.g., through Mode-1 like approach) based on the received power headroom information.

In some implementations, the SL-PHR configuration may be configured per MAC entity basis, where each MAC entity may be associated with an SL operation.

In some implementations, the SL-PHR procedure may cause the UE to report the difference between the nominal UE maximum transmit power and the estimated power of an SL packet transmission, where the SL packet transmission may include any combination of a PSSCH, a PSCCH, a PSFCH, and an SL reference signaling transmission (e.g., an SL synchronization burst set delivery).

In some implementations, the SL-PHR procedure may be associated with the Uu interface (e.g., the UE reports an SL-PHR to a serving gNB through the Uu interface). Therefore, the UE may transmit an SL-PHR in the Uu interface if the UE is allocated with UL resources that can accommodate the MAC CE for the SL-PHR that the MAC entity is configured to transmit.

In some implementations, the SL-PHR procedure may be associated with PC5 interface (e.g., UE reports SL-PHR to a UE in the same platoon through PC5 interface). Therefore, UE may transmit SL-PHR in PC5 interface if the UE is allocated with SL resources that can accommodate the MAC CE for SL-PHR that the MAC entity is configured to transmit.

Examples of detailed parameters of an SL-PHR are shown in Table 10.

TABLE 10

Parameters and UE behavior for SL-PHR

| SL-PHR configuration | Notes |
| --- | --- |
| phr-PeriodicTimerSL | (1) phr-PeriodicTimerSL= ENUMERATED {sf10, sf20, sf50, sf100, sf200, sf500, sf1000, infinity}, value in number of subframes for SL-PHR reporting, sf10 corresponds to 10 subframes, sf20 corresponds to 20 subframes, and so on.<br>(2) If the MAC entity has sidelink resources allocated for a new transmission and if it is the first SL resource allocated for a new transmission since the last MAC reset (MAC reset to PC5 interface), the UE may start phr-PeriodicTimerSL.<br>(3) UE may trigger an SL-PHR if phr-PeriodicTimerSL expires.<br>(4) if the allocated physical resources (which is associated with SL or UL) can accommodate the MAC CE for SL-PHR which the MAC entity is configured to transmit, plus its subheader, then the UE may transmit SL-PHR with the associated interface and the start or restart phr-PeriodicTimerSL. |
| phr-ProhibitTimerSL phr-Tx-PowerFactorChangeSL | (1) phr-ProhibitTimerSL = ENUMERATED {sf0, sf10, sf20, sf50, sf100, sf200, sf500, sf1000}, value in number of subframes for SL-PHR reporting. sf0 corresponds to 0 subframe, sf10 corresponds to 10 subframes, sf20 corresponds to 20 subframes, and so on.<br>(2) phr-Tx-PowerFactorChangeSL = ENUMERATED {dB1, dB3, dB6, infinity}, value in dB for SL-PHR reporting. Value dB1 corresponds to 1 dB, dB3 corresponds to 3 dB and so on.<br>(3) UE may trigger an SL-PHR if phr-ProhibitTimerSL expires or has expired and the path loss has changed more than phr-Tx-PowerFactorChangeSL dB for at least one activated Serving Cell (or corresponding synchronization source, or scheduler) of any MAC entity which is used as a pathloss reference since the last transmission of an SL-PHR in this MAC entity when the MAC entity has associated sidelink resources for new transmission.<br>(4) UE may trigger an SL-PHR if phr-ProhibitTimerSL expires or has expired, and when the MAC entity has valid sidelink resources for new transmission, and the following is true for any of the activated Serving Cells (or another UE if the SL-PHR is configured on PC5 interface) of any MAC entity with configured sidelink: there are SL resources allocated for transmission in this cell/BWP, and the required power backoff due to power management for this cell/UE has changed more than phr-Tx-PowerFactorChangeSL dB since the last transmission of an SL-PHR when the MAC entity had sidelink resources allocated for transmission. |

Therefore, based on the proposed SL-PHR procedure, the SL-PHR procedure may not be cancelled with the MAC reset at least in some cases (e.g., depending on the associated resource), as shown in Table 11.

TABLE 11

Proposals to SL-PHR Procedure to MAC Reset

| MAC reset | Proposals |
| --- | --- |
| stop (if running) all timers; | 1) If an SL-PHR procedure is introduced: phr-ProhibitTimerSL and phr-PeriodicTimerSL should not be stopped with the MAC reset.<br>In some additional implementations:<br>a) If the SL-PHR configuration is associated with a |

TABLE 11-continued

Proposals to SL-PHR Procedure to MAC Reset

| MAC reset | Proposals |
|---|---|
| cancel, if any, triggered sidelink power headroom reporting procedure; | UL resource (e.g., PUSCH), then the SL-PHR timers may be stopped (or cancelled) with the MAC reset.<br>b) If the SL-PHR configuration is associated with a sidelink resource (e.g., PSFCH or PSSCH) resource, then the SL-PHR timers may not be stopped with the MAC reset.<br>1) If an SL-PHR procedure is introduced: the triggered SL-PHR procedure should not be cancelled with the MAC reset and so the stored SL-PHR configuration is also stored on the UE side (e.g., in the UE context).<br>In some additional implementations:<br>c) If the SL-PHR configuration is associated with a UL resource (e.g., PUCCH), then the triggered SL-PHR procedure may be cancelled with the MAC reset.<br>d) If the SL-PHR configuration is associated with a sidelink resource (e.g., PSFCH or PSSCH), then the triggered SL-PHR procedure may not be cancelled with the MAC reset.<br>Therefore, SL-PHR procedures for different ProSe destinations may be treated differently depending on whether the SL-PHR procedures is configured (or triggered) on the Uu interface or PC5 interface for one or more ProSe destinations. In addition, an SL-PHR procedure may not be cancelled if the MAC reset does not apply to all ProSe destinations associated with the SL-PHR procedure.<br>In some additional implementations:<br>Whether SL-PHR configurations may/may not be cancelled may be based on different cast-types for each ProSe destination. For example,<br>a) SL-PHR procedures for unicast V2X service may not be cancelled with the MAC reset.<br>b) In contrast, SL-PHR procedures for broadcast/group-cast V2X service may be cancelled with the MAC reset.<br>In some implementations, whether SL-PHR configurations may/may not be cancelled may be based on different scenarios, as shown in FIG. 5, FIG. 6 or FIG. 7. For example, if the SL-PHR configuration is provided by the serving gNB, the corresponding SL-PHR procedure may be cancelled with the MAC reset. For example, if the SL-PHR configurations is provided by a scheduler or by pre-configuration, the corresponding SL-PHR procedure may not be cancelled with the MAC reset. |

Other SL Procedures

In some implementations, SL HARQ procedures (with/without Acknowledgement (ACK)/Negative-Acknowledgment (NACK) message feedback design) may not be cancelled with the MAC reset caused by the Uu interface. In addition, the toggled New Data Indicator (NDI) and the soft buffer may not be impacted with the MAC reset caused by the Uu interface. In some implementations, the SL HARQ procedures may not be cancelled when the SL operation is configured by a scheduler or by a pre-configuration rather than being configured by a serving RAN. In contrast, the SL HARQ procedures may be cancelled with the MAC reset if the SL HARQ configurations are provided by the serving RAN.

In some implementations, the SL HARQ buffers may not be flushed if the SL resource pools is pre-configured (e.g., by the upper layers or based on stored pre-configuration). For example, the SL HARQ buffer may not be flushed when the SL BWP changes (e.g., when the numerology is not impacted by the BWP change).

In some implementations, (part of) SL grant decision procedures may not be impacted by the MAC reset. For example, the counter on the SL grant decision, as shown in Table 12, may not be impacted by the MAC reset.

TABLE 12

Proposals of SL Grant Decision procedure to MAC Reset

| Parameters | Note |
|---|---|
| SL_RESOURCE_RESELECTION_COUNTER | As the SL_RESOURCE_RESELECTION_COUNTER in LTE SL protocol (e.g., TS 36.321.f.4.0) |

Moreover, the SL grant may be configured by a UE autonomous selection, a gNB configuration or a scheduler configuration.

In some implementations, the SL grant which is dedicated by a gNB through DCI in the Uu interface may be released with the MAC reset. In contrast, the SL grant which the UE selects from the SL resource pools (e.g., configured by a gNB through broadcasting message (e.g., system information) or through dedicated control signaling (e.g., RRC signaling)) may not be released with the MAC reset. In addition, the configured SL resource pools may also be kept after the MAC reset.

In some implementations, the SL grant provided by a scheduler or by pre-configuration may not be released with the MAC reset. In contrast, the SL grant provided by the gNB (through DCI) may be released.

In some implementations, the configured SL grant (e.g., which is configured by a scheduler or a pre-configuration) may not be released (or be cleared) with the MAC reset. The configured SL grant may include Type 1/Type 2 SL configured grant. For example, when the MAC reset is instructed by the upper layer (e.g., RRC layer or RRC entity) because the UE receives a RRCRelease message which includes suspendConfig (in other words, the UE is instructed to move to (LTE/NR) RRC inactive state), the Type 1/Type 2 SL configured grant may still be valid for the UE after the UE moves to the RRC inactive state. Therefore, the Type 1/Type 2 SL configured grant would not be released/cleared with the MAC reset and the MAC entity could still transmit SL packets in the MAC entity by applying the valid Type 1/Type 2 SL configured grant. In some additional embodiments, the serving cell may further indicate which Type 1/Type 2 SL configured grant are still valid through delta signaling approach (e.g., the serving cell transmit the index associated of Type 1/Type 2 SL configured grant to indicate those Type 1/Type 2 SL configured grant which should be released/cleared after the UE moving to RRC inactive state. Then, other stored Type 1/Type 2 sidelink configured grant are still valid after the UE moves to RRC inactive state).

Both the Type 1 sidelink configured grant and Type 2 sidelink configured grant may be applied in the LTE/NR PC5 interface. For one LTE/NR MAC entity on the UE side, the (LTE/NR) Type 1 sidelink configured grant is a type of configured grant provided by the upper layers (e.g., LTE/NR RRC layer). In addition, after receiving the SL configuration of a Type 1 sidelink configured grant from the upper layer, the MAC entity would store the SL configuration as a configured sidelink grant and the MAC entity may implement sidelink packet transmission by applying the stored Type 1 sidelink configured grant. The Type 1 sidelink configured grant would be provided continuously in the time domain after the Type 1 sidelink configured grant is configured for the MAC entity.

In some embodiments, the Type 1 sidelink configured grant is activated and valid directly after the MAC entity receives the configuration of Type 1 sidelink configured grant from the upper layers. In some other embodiments, the Type 1 sidelink configured grant is valid but in-activated for the MAC entity after the MAC entity receives the configuration of a Type 1 sidelink configured grant from the upper layers. In contrast, the serving cell may still need to send one activation message to the UE through dedicated control signaling (e.g., Downlink Control Information or MAC control Element) to activate the corresponding Type 1 sidelink configured grant.

The SL configuration of Type 1 sidelink configured grant may (at least) include: a) the locations of physical resource blocks (e.g., the location in in time domain and frequency domain); b) the duration (e.g., in time domain); c) offset of a resource with respect to System Frame Number=0 in time domain; d) the number of SL-HARQ processes for the corresponding Type 1 sidelink configured grant; and e) One specific RNTI for resource allocation of retransmission. One UE may be configured with one or more than one Type 1 sidelink configured grant. In addition, each Type 1 sidelink configured grant may be associated with one unique identity in MAC/RRC entity to differentiate each Type 1 sidelink configured grant independently.

For one LTE/NR MAC entity on the UE side, a (LTE/NR) Type 2 sidelink configured grant is a type of configured grant for which part of the SL configuration (such as the periodicity in time domain and the number of SL-HARQ processes for the corresponding Type 2 sidelink configured grant) is provided by the upper layers (e.g., LTE/NR RRC layer) and another part of the SL configuration (such as the locations of physical resources in time/frequency domain) is provided by the Downlink Control Information. One Type 2 sidelink configuration may be activated by the serving cell when the serving cell transmits one DCI which configures the physical resource blocks for the target Type 2 sidelink configuration (e.g., One MAC entity may be configured with more than one Type 2 sidelink configured grant.

Each Type 2 sidelink configuration may be associated with one unique identity and so the received DCI may include one identity to indicate which Type 2 sidelink configured grant is activated and the locations of the corresponding physical resource blocks). Therefore, after receiving the DCI which activates one Type 2 sidelink configured grant, the UE may store the configuration in MAC entity and then the MAC entity may implement sidelink packet transmission by applying the stored Type 2 sidelink configured grant. The Type 2 sidelink configured grant would be provided continuously in time domain after the Type 2 sidelink configured grant is activated.

In some additional embodiments, the serving cell may send other downlink control signaling (e.g., DCI) to de-activate one activated Type 2 sidelink configured grant (therefore, the identity of the activated Type 2 sidelink configured grant is also included in the DCI when the serving cell wants to de-activate the activated Type 2 sidelink configured grant). The MAC entity may clear the stored Type 2 sidelink configured grant after receiving the DCI to de-activate one activated Type 2 sidelink configured grant.

In some other implementations, the (Type 1/Type 2) SL configured grant which is configured by the serving gNB/eNB may be released/cleared with the MAC reset. For example, when the MAC reset is triggered while the RRC re-establishment procedure is initiated, the MAC entity may release (or clear) the configured Type 1/Type 2 SL configurated grant stored in the MAC entity (e.g., while a timer T310 expires or through the instruction from the RRC layer directly). In other words, the Type 1/Type 2 SL configured grant is valid in the MAC entity before the T310 expires. Then, after the T310 expires, the Type 1/Type 2 SL configured grant may be released/cleared with the MAC reset implementation in the MAC entity (e.g., even the UE may stay in RRC Connected state during the RRC re-establishment procedure).

In some other embodiments, the MAC entity may release (or) clear the configured Type 1/Type 2 SL configured grant stored in the MAC entity if the RRC entity is implementing full configuration in the corresponding RRC entity (e.g., while the UE cannot perform a new sidelink configuration, which is received from the serving cell). In some additional embodiments, the new sidelink configuration may be delivered to the UE through a delta signaling approach by jointly considering the existing sidelink configuration stored in the UE side. The timing of full configuration may depend on the following conditions: 1) the (LTE/NR) serving cell instructs the UE to implement full configuration through dedicated control signaling; 2) during (LTE/NR) RRC state transition; 3) the system information configured for V2X service broadcast by the serving cell is modified (by the serving cell itself).

In some other embodiments, while the MAC entity releases/clears the Type 1/Type 2 SL configured grant, the RRC entity may still store the SL configuration of the Type 1/Type 2 SL configured grant. Then, the RRC entity may re-configure the stored Type 1/Type 2 SL configured grant configuration to the MAC layer while at least one of the pre-defined events is fulfilled, such as: 1) the UE resumes its RRC state from (LTE/NR) RRC inactive state to (LTE/NR) RRC connected state; 2) the RRC re-establishment procedure is finished and the RRC connection is kept successfully.

In another example, when the MAC reset is instructed because the UE receives a RRCRelease message which includes suspendConfig (in other words, the UE is instructed to move to (LTE/NR) RRC inactive state), the Type 1/Type 2 SL configured grant (e.g., the Type 1/Type 2 SL configured grant via which UE receives the related SL configuration through dedicated RRC signaling such as a RRC(connection)Reconfiguration message) may be released/cleared in the RRC entity of the UE after the UE moves to (LTE/NR) RRC inactive state. In addition, in the MAC entity, the Type 1/Type 2 SL configured grant would be cleared with the MAC reset while the UE moves to RRC inactive state.

In some other example, when the MAC reset is instructed because the UE receives a RRCRelease message which includes suspendConfig (in other words, the UE is instructed to move to (LTE/NR) RRC inactive state by the serving RAN), the configured Type 1/Type 2 SL configured grant (e.g., the Type 1/Type 2 SL configured grant via which UE receives the related SL configuration through dedicated RRC signaling such as a RRC(connection)Reconfiguration message) may be valid and activated in the RRC entity of the UE side after the UE moves to (LTE/NR) RRC inactive state. In addition, in the MAC entity, the Type 1/Type 2 SL configured grant may still be valid in the MAC entity without being impacted by MAC reset when the UE moves to RRC inactive state. In some additional embodiments, the serving cell may configure a subset of Type 1/Type 2 sidelink configured grant(s) that are valid after moving to the RRC inactive state by transmitting the identities associated with these target Type 1/Type 2 sidelink configured grants in the RRCRelease message (e.g., by configuring the associated identities in the suspendConfig). In contrast, the stored Type 1/Type 2 sidelink configured grants of which the associated identities are not indicated in the RRCRelease message would be released/cleared in the MAC entity after the UE moves to RRC inactive state.

In some implementations, if the UL timing advance is not applicable, the UE may apply the SL packet transmission/reception based on the last UL timing instruction received from the serving cell(s).

In some implementations, the SL sensing/measurement procedures should not be impacted by the MAC reset (e.g., caused by the Uu interface).

For example, the Channel Busy Ratio (CBR) procedure and Channel Occupancy Ratio (CR) procedure on the PC5 interface should not be impacted by the MAC reset (in the Uu interface).

In some implementations, the CBR measured in subframe n may be defined as follows:
For PSSCH, the portion of sub-channels in the resource pool whose S-RSSI measured by the UE exceeds a (pre-)configured threshold sensed over subframes [n−100, n−1].
For PSCCH, in a pool (pre)configured such that the PSCCH may be transmitted with its corresponding PSSCH in non-adjacent resource blocks, the portion of the resources of the PSCCH pool whose S-RSSI measured by the UE exceeds a (pre-)configured threshold sensed over subframes [n−100, n−1] (assuming that the PSCCH pool is composed of resources with a size of two consecutive PRB pairs in the frequency domain).

In some implementations, the CR evaluated at subframe n may be defined as the total number of sub-channels used for its transmissions in subframes [n−a, n−1] and granted in subframes [n, n+b] divided by the total number of configured sub-channels in the transmission pool over [n−a, n+b].

In some implementations, when MAC reset is triggered, the CBR/CR measurement configuration may not be released and the UE may continue performing the CBR measurement and provide the measurement report to the target UE (e.g., the scheduler or other UEs in SL) or the serving gNB based on the received CBR measurement configuration. In some implementations, the CBR/CR configuration and the report may also be configured by the serving gNB (or the scheduler) by following the signaling flow shown in FIG. 5, FIG. 6, or FIG. 7. Then, the UE may also provide CBR/CR measurement results to the serving gNB/scheduler based on the signaling flow shown in FIG. 5, FIG. 6, or FIG. 7.

In some implementations, the CBR/CR measurement configuration may be released and the ongoing CBR/CR measurement procedures may be reset with the MAC reset if the CBR/CR measurement are provided by the serving RAN. In some other implementations, the CBR/CR measurement configuration may not be released and the ongoing CBR/CR measurement procedures may not be canceled after the MAC reset if the CBR/CR measurement configurations are provided by the scheduler or by the pre-configuration.

LTE MAC Entity Reset Due to NR Uu Interface

In some implementations, the condition(s) under which the NR protocols implement the LTE PC5 interface and the NR PC interface for the LTE V2X service is further described. Two example cases are provided:

Case 1

Figure 8:
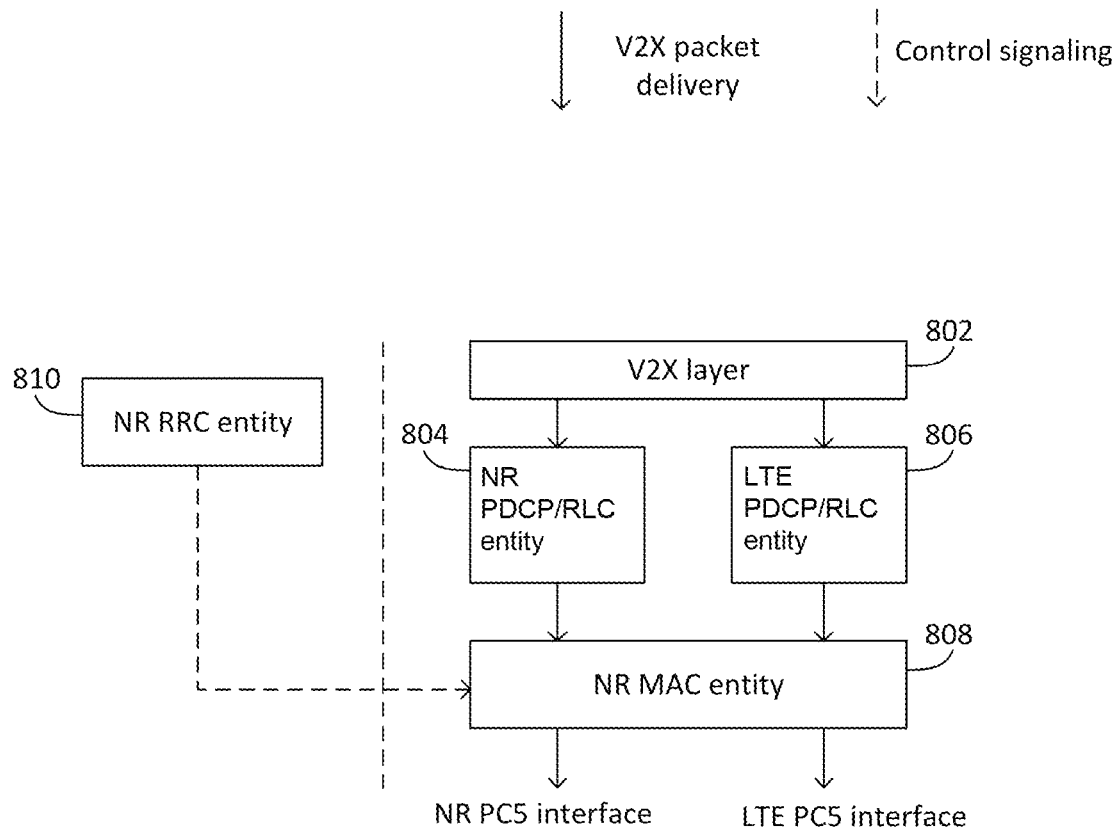
FIG. 8 illustrates a case where a New Radio (NR) Radio Resource Control (RRC) entity may configure an NR MAC entity of a UE that covers both an NR PC5 interface and a Long Term Evolution (LTE) PC5 interface, in accordance with an example implementation of the present application.

FIG. 8 illustrates a case where an NR RRC entity may configure an NR MAC entity of a UE that covers both an NR PC5 interface and an LTE PC5 interface, in accordance with an example implementation of the present application.

As shown in FIG. 8, the UE may include V2X layer 802, NR Packet Data Convergence Protocol (PDCP)/Radio Link Control (RLC) entity 804, LTE PDCP/RLC entity 806, NR MAC entity 808, and NR RRC entity 810. It is noted that the solid arrows illustrated in FIG. 8 may refer to the directions of V2X packet delivery, and the dashed arrows may refer to the directions of control signaling.

In the example implementation, NR RRC entity 810 may configure NR MAC entity 808 that includes both NR PC5 interface and LTE PC5 interface. In addition, when the Uu interface is disconnected (e.g., due to RRC RLF or on-demand SI failure), NR RRC entity 810 may trigger a MAC reset operation (MAC reset) for NR MAC entity 808. So, both the NR PC5 interface and LTE PC5 interface may be reset jointly by one MAC reset signaling (e.g., a single MAC reset instruction sent by NR RRC entity 810). When NR MAC entity 808 (for the LTE/NR PC5 interface) is reset, timers/counters may be stopped, buffers may be cleared, and procedures (such as the SL-SR, SL-BSR, and SL-PER procedure) may be released (e.g., as indicated by the MAC reset operation in Table 2).

Case 2

Figure 9:
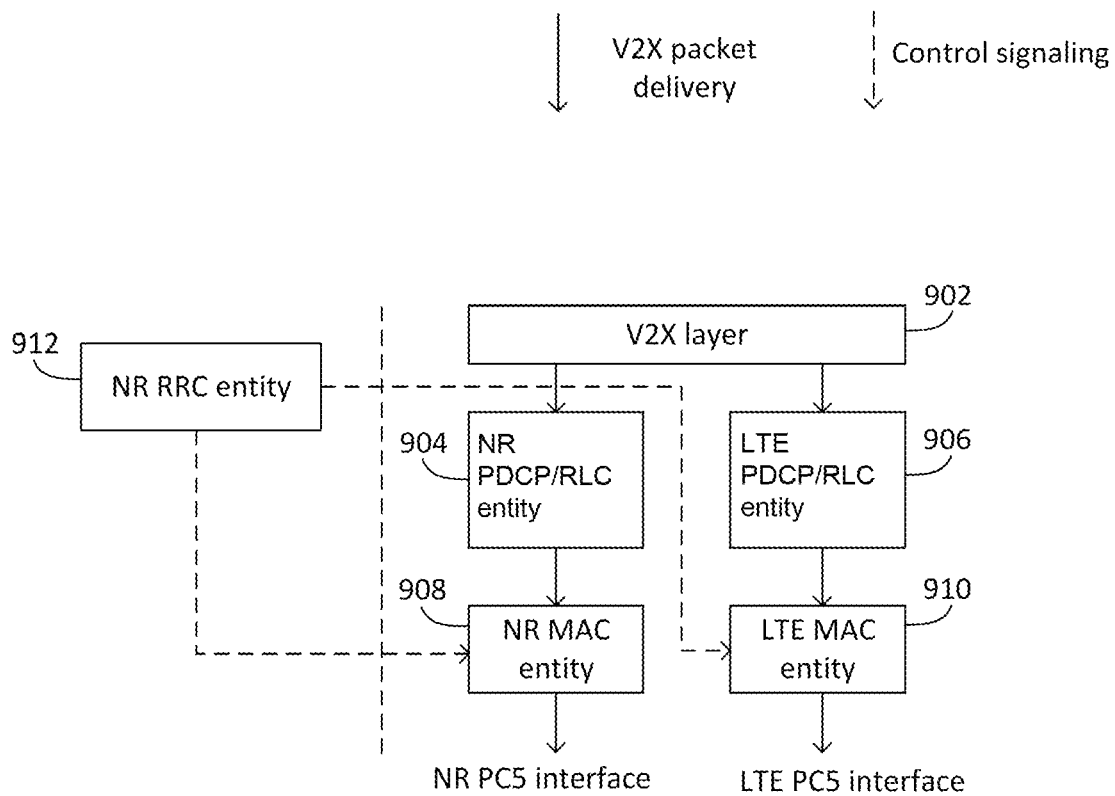
FIG. 9 illustrates a case where an NR RRC entity may configure two MAC entities of a UE, in accordance with an example implementation of the present application.

FIG. 9 illustrates a case where an NR RRC entity may configure two MAC entities of a UE, in accordance with an example implementation of the present application.

As shown in FIG. 9, the UE may include V2X layer 902, NR PDCP/RLC entity 904, LTE PDCP/RLC entity 906, NR MAC entity 908, LTE MAC entity 910, and NR RRC entity 912. It is noted that the solid arrows illustrated in FIG. 9 may refer to the directions of V2X packet delivery, and the dashed arrows may refer to the directions of control signaling.

In the example implementation, NR RRC entity 912 may configure NR MAC entity 908 and LTE MAC entity 910, where NR MAC entity 908 may cover configurations and procedures (e.g., SL-SR/SL-BSR/SL-PHR procedures) of the NR PC5 interface, and LTE MAC entity 910 may cover configurations and procedures (e.g., SL-BSR procedures) of LTE PC5 interface. Both of NR MAC entity 908 and LTE MAC entity 910 may operate independently. In addition, once the NR Uu interface is disconnected (e.g., due to an RRC RLF or on-demand SI failure), NR RRC entity 912 may trigger MAC reset operations to NR MAC entity 908 and LTE MAC entity 910 by sending two separate control signaling to NR MAC entity 908 and LTE MAC entity 910, respectively, where one control signaling is to reset NR MAC entity 908 and another control signaling is to reset LTE MAC entity 910. When the LTE/NR MAC entity (for the LTE/NR PC5 interface) is reset, timers/counters may be stopped, buffers may be cleared, and procedures (such as the SL-SR, SL-BSR, and SL-PHR procedure) may be released (e.g., as indicated by the MAC reset operation in Table 2).

Case 3

Figure 10:
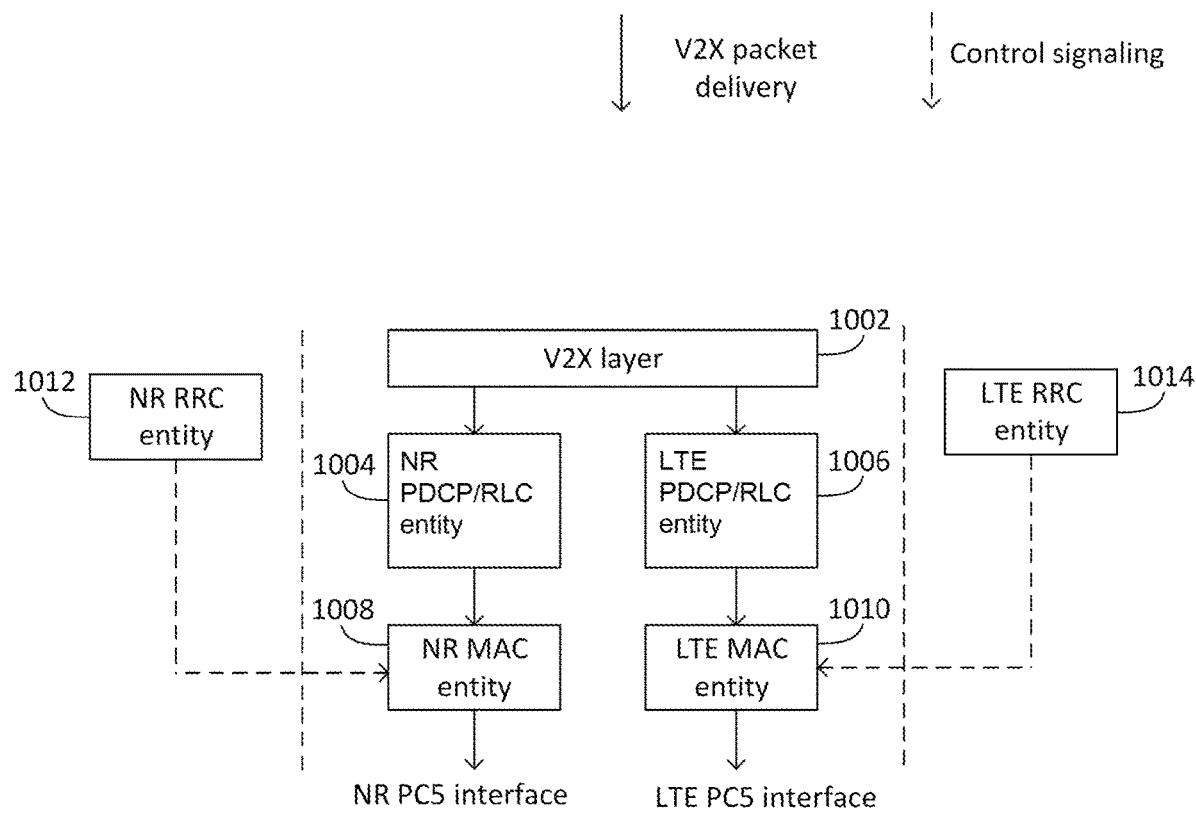
FIG. 10 illustrates a case where two RRC entities may configure two MAC entities of a UE, respectively, in accordance with an example implementation of the present application.

FIG. 10 illustrates a case where two RRC entities may configure two MAC entities of a UE, respectively, in accordance with an example implementation of the present application.

As shown in FIG. 10, the UE may include V2X layer 1002, NR PDCP/RLC entity 1004, LTE PDCP/RLC entity 1006, NR MAC entity 1008, LTE MAC entity 1010, NR RRC entity 1012 and LTE RRC entity 1014. It is noted that the solid arrows illustrated in FIG. 10 may refer to the directions of V2X packet delivery, and the dashed arrows may refer to the directions of control signaling.

In the example implementation, the two independent RRC entities, NR RRC entity 1012 and LTE RRC entity 1014, may be generated to support the LTE V2X service and the NR V2X service respectively. For example, the UE may receive SL resource configurations for LTE V2X services from a serving NR-RAN (e.g., through dedicated RRC control singalongs or through system information broadcast from a serving NR cell) or through a pre-configuration. Then, based on the received configurations (which may be relayed from NR RRC entity 1012 to LTE RRC entity 1014), LTE RRC entity 1014 may be derived in the UE side to support the LTE V2X service. In addition, LTE RRC entity 1014 may be further in charge of Layer 1 (e.g., PHY layer)/Layer 2 (e.g., MAC layer/RLC layer/PDCP layer) sub-layer configurations of the LTE PC5 interface. In some implementations, the UE's RRC state may be dominated by one of the RRC entities. For example, the RRC state may be decided by NR RRC entity 1012 if the UE has a serving NR cell.

In some implementations, the MAC reset triggered by NR RRC entity 1012 may further impact the LTE PC5 interface. In such a case, NR RRC entity 1012 may also request LTE RRC entity 1014 to reset LTE MAC entity 1010 through an intra-node control signaling. After receiving the request from NR RRC entity 1012, LTE RRC entity 1014 may trigger a MAC reset on LTE MAC entity 1010.

In some implementations, the MAC reset operation may be triggered by different causes (for example, by referring to the events which may trigger the MAC reset according to NR protocols shown in Table 1) or by the causes triggered by the PC5 interface (for example, the SL RLF caused by the PC5 interface). In some implementations, the RRC entity (e.g., the NR RRC entity) may decide whether to trigger the MAC reset or to reset different parts of MAC functionalities (e.g., only reset MAC functionalities on the Uu interface and maintain the MAC functionalities on the PC5 interface, or vice versa) based on the causes derived in the RRC entity.

In some implementations, the RRC entity may instruct MAC reset with the cause to the MAC entity. Therefore, the MAC entity may determine whether to reset all the MAC layer or part of the MAC functionalities accordingly based on the cause provided by the RRC entity. In some implementations, the RRC entity may decide whether to reset the MAC functionalities of the PC5 interface by referring to how the SL configurations are derived (e.g., through pre-configuration or through control signaling received from the serving cell). In addition, in some implementations, by referring to FIG. 10, only the dominant RRC entity (e.g., NR RRC entity 1012 or L RRC entity 1014) may decide the cause of MAC reset.

Examples of different causes that may trigger different behaviors to reset (part of) the MAC functionalities are shown in Table 13.

TABLE 13

| Cause of MAC Reset | MAC Reset |
| --- | --- |
| Triggered by the Uu interface Cause events: summarized in Table 1. | (1) To Uu interface, =>Reset MAC functionalities of Uu interface. (2) To PC5 interface, If the functions are derived by scheduler or by pre-configuration: =>Keep the corresponding MAC functions; Else if the functions are derived by serving cell: =>Reset the corresponding MAC functions. |

TABLE 13-continued

| Cause of MAC Reset | MAC Reset |
| --- | --- |
| Triggered by the PC5 interface Cause events: Sidelink radio link failure event, etc. | (3) To Uu interface, =>Maintain MAC functionalities of Uu interface. (4) To PC5 interface, =>Reset the corresponding MAC functions. |

In some implementations, different treatments may be applied to different types of V2X services (or session/connection). For example, for a URLLC service, the V2X session created for this URLLC service may be kept without being impacted by the MAC reset in the Uu interface. In comparison, to other non-URLLC services, their corresponding V2X sessions may be reset with the MAC reset. Also note, implementations described herein may not be limited by the granularity of SL operations and measurement procedures. For example, in the NR protocol, the granularity of the SL grant configuration and the SL sensing procedure may be realized in a symbol-level and implementations described herein are still applicable.

Figure 11:
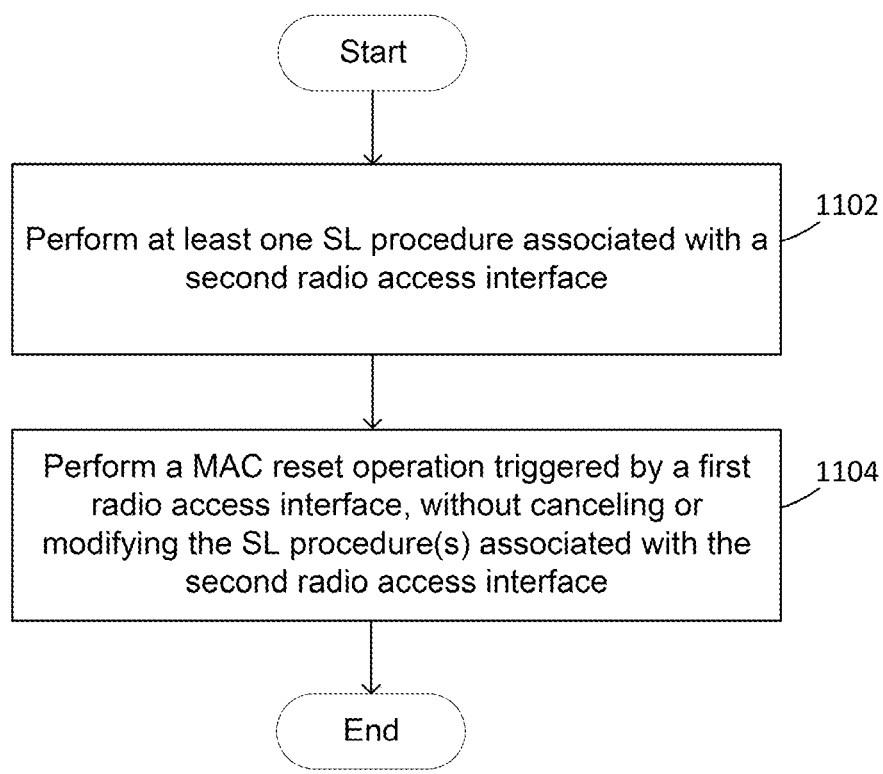
FIG. 11 is a flowchart of a method performed by a UE for SL communications, in accordance with an example implementation of the present application.

FIG. 11 is a flowchart of a method performed by a UE for SL communications, in accordance with an example implementation of the present application.

As shown in FIG. 11, in action 1102, the UE may perform at least one SL procedure (e.g., one or more SL-SR/SL-BSR/SL-PHR procedures) associated with a second radio access interface. In action 1104, the UE may perform a MAC reset operation triggered by a first radio access interface, without canceling or modifying the SL procedure(s) associated with the second radio access interface.

The first radio access interface and the second radio access interface may have the same or different interface types. For example, if the first and second radio access interfaces have different interface types, one of the first radio access interface and the second radio access interface may be an NR Uu interface or an LTE Uu interface, and the other radio access interface may be an NR PC5 interface or an LTE PC5 interface. For example, the first radio access interface may be (but not limited to) an NR/LTE Uu interface, and the second radio access interface may be (but not limited to) an NR/LTE PC5 interface. In another example, the first radio access interface may be (but not limited to) an NR/LTE PC5 interface, and the second radio access interface may be (but not limited to) an NR/LTE Uu interface.

Figure 12:
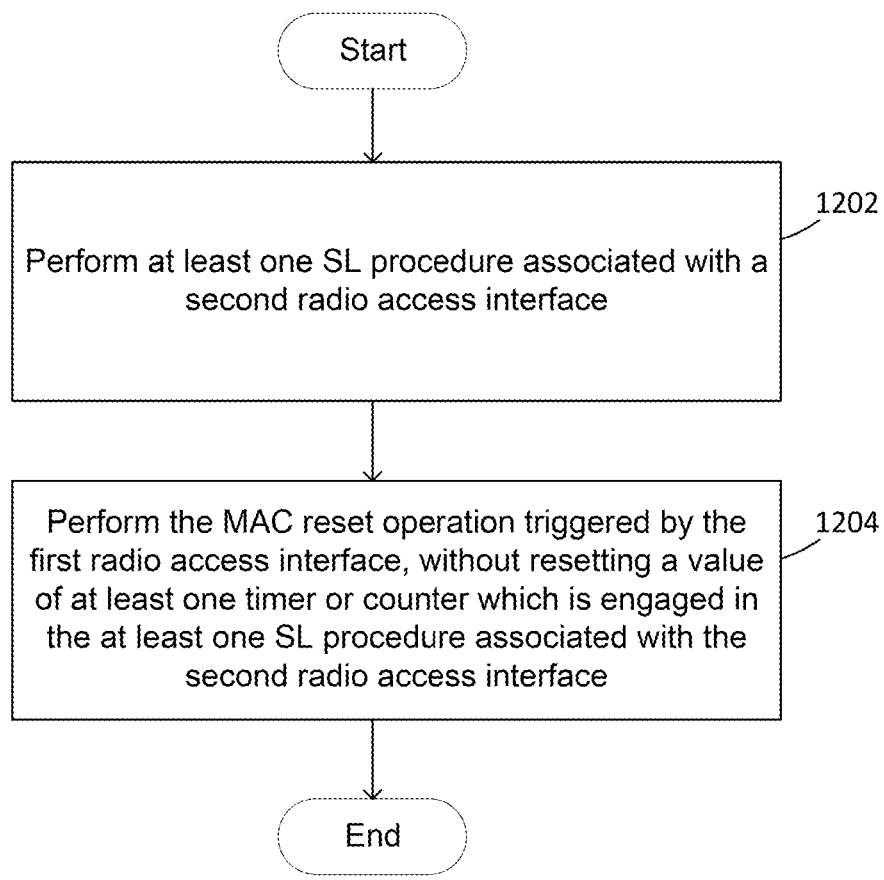
FIG. 12 is a flowchart of a method performed by a UE for SL communications, in accordance with an example implementation of the present application.

FIG. 12 is a flowchart of a method performed by a UE for SL communications, in accordance with an example implementation of the present application.

As shown in FIG. 12, in action 1202, the UE may perform at least one SL procedure (e.g., one or more SL-SR/SL-BSR/SL-PHR procedures) associated with a second radio access interface. In action 1204, the UE may perform the MAC reset operation triggered by the first radio access interface, without resetting a value of at least one timer or counter which is utilized in the at least one SL procedure associated with the second radio access interface. For example, if the SL procedure associated with the second radio access interface is an SL-BSR procedure, then one or more timers engaged in the SL-BSP procedure (e.g., at least one of periodicBSR-TimerSL, retxBSR-TimerSL, and logicalChannelSR-DelayTimerSL) may not be stopped when the UE performs the MAC reset operation triggered by the first radio access interface.

Figure 13:
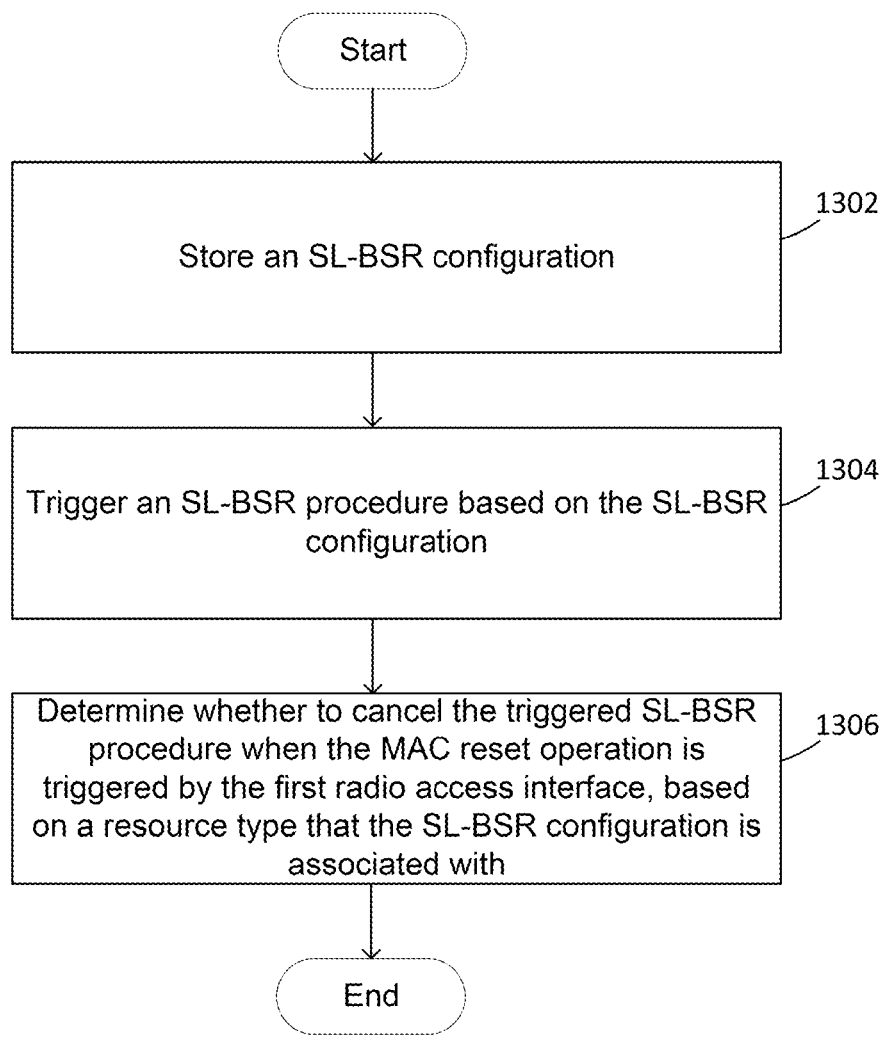
FIG. 13 is a flowchart of a method performed by a UE for SL communications, in accordance with an example implementation of the present application.

FIG. 13 is a flowchart of a method performed by a UE for SL communications, in accordance with an example implementation of the present application.

In action 1302, the UE may store an SL-BSR configuration.

In action 1304, the UE may trigger an SL-BSR procedure based on the SL-BSR configuration.

In action 1306, the UE may determine whether to cancel the triggered SL-BSR procedure when the MAC reset operation is triggered by the first radio access interface, based on a resource type (e.g., a type of UL resource or a type of SL resource) that the SL-BSR configuration is associated with.

Figure 14:
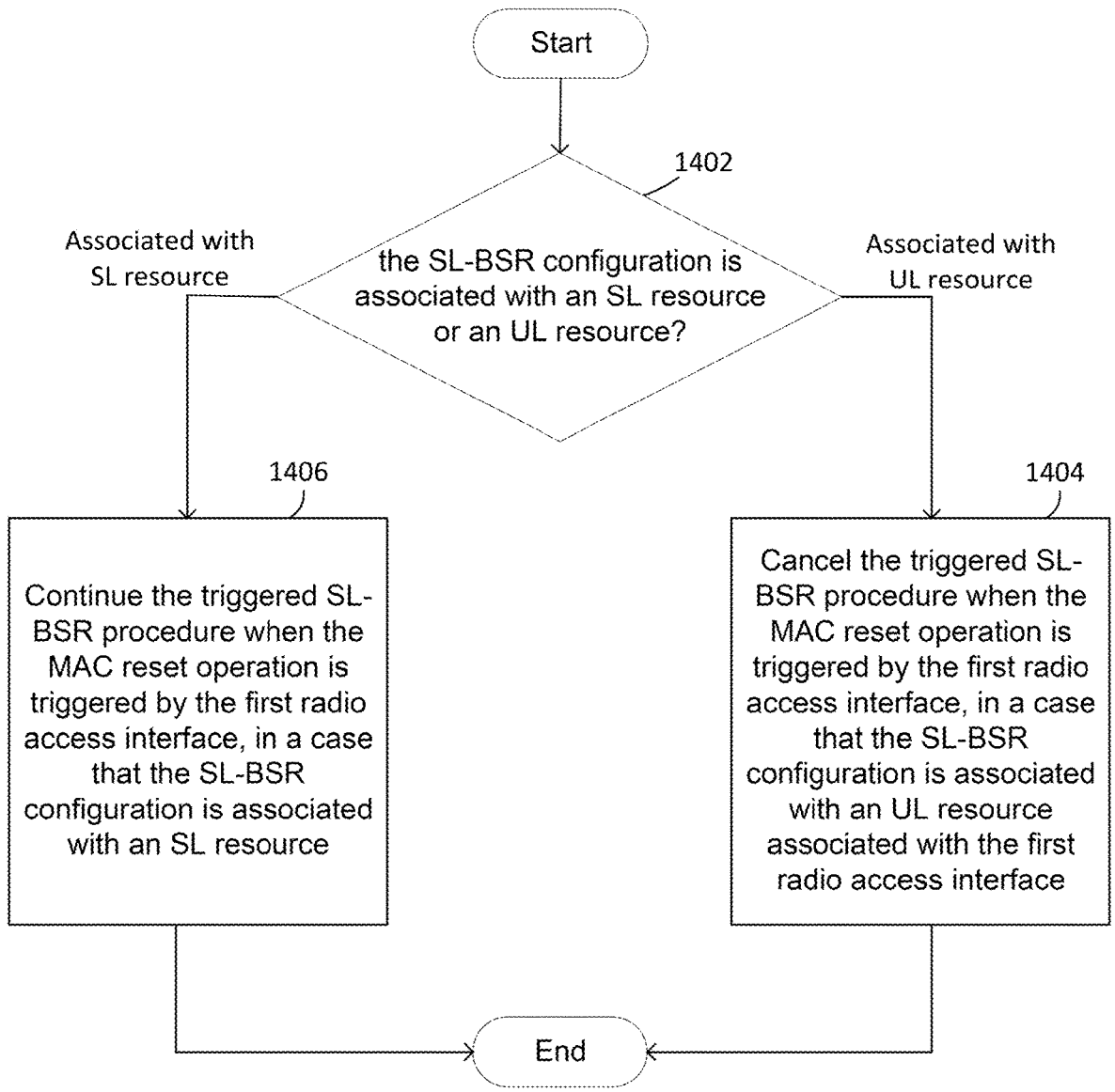
FIG. 14 is a flowchart of a detailed procedure of action, in accordance with an example implementation of the present application.

FIG. 14 is a flowchart of a detailed procedure of action 1306, in accordance with an example implementation of the present application.

In action 1402, the UE may determine whether the SL-BSR configuration is associated with an SL resource or an UL resource.

In action 1404, the UE may cancel the triggered SL-BSR procedure when the MAC reset operation is triggered by the first radio access interface, in a case that the SL-BSR configuration is associated with an UL resource (e.g., a PUCCH or a PUSCH) associated with the first radio access interface.

In action 1406, the UE may continue the triggered SL-BSR procedure when the MAC reset operation is triggered by the first radio access interface, in a case that the SL-BSR configuration is associated with an SL resource (e.g., a PSFCH or a PSCCH).

For example, if the SL-BSR configuration is associated with an UL resource (e.g., a PUCCH), then the SL-BSR timers and/or counters (e.g., timers and/or counters engaged in the SL-BSR procedure) may be stopped with the MAC reset operation. In contrast, if the SL-BSR configuration is associated with an SL resource (e.g., a PSFCH or a PSCCH), then the SL-BSR timers and/or counters may not be stopped with the MAC reset.

Figure 15:
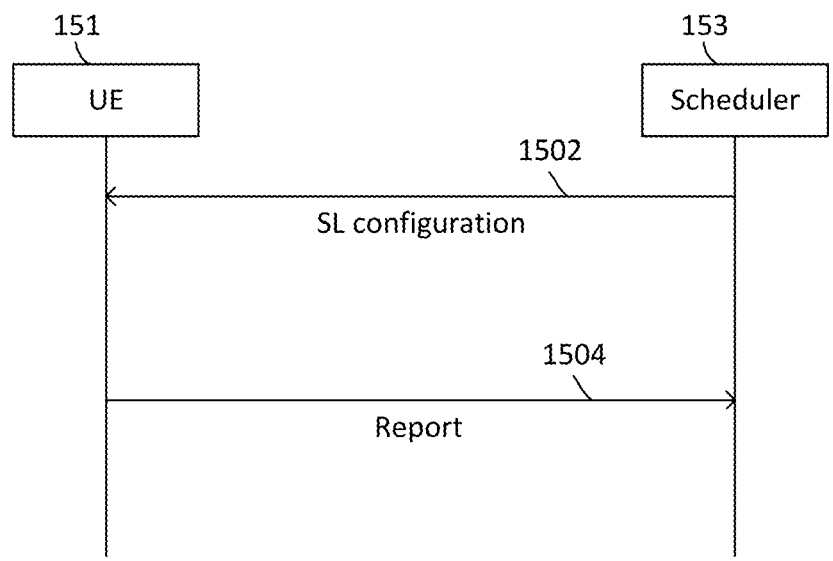
FIG. 15 is a flowchart of a method performed by a UE for SL communications, in accordance with an example implementation of the present application.

FIG. 15 is a flowchart of a method performed by a UE for SL communications, in accordance with an example implementation of the present application.

In action 1502, UE 151 may receive at least one SL configuration from scheduler UE 153 through the second radio access interface (e.g., an NR/LTE PC5 interface). The SL configuration may be an SL-SR/SL-BSR/SL-PHR configuration.

In action 1504, UE 151 may transmit a report to scheduler UE 153 through the second radio access interface based on the SL configuration(s) received from scheduler UE 153.

Figure 16:
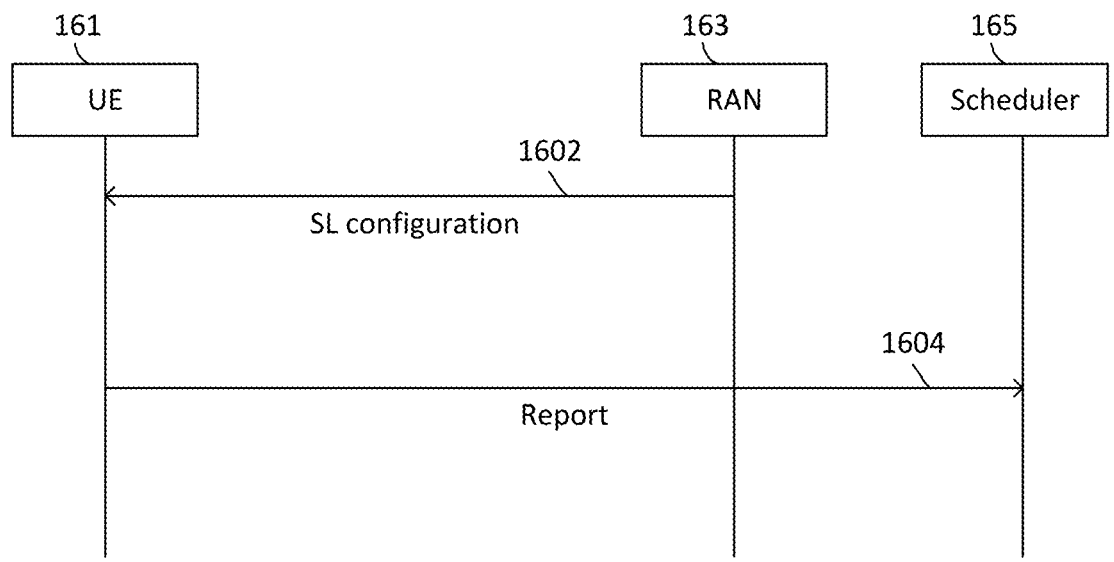
FIG. 16 is a flowchart of a method performed by a UE for SL communications, in accordance with an example implementation of the present application.

FIG. 16 is a flowchart of a method performed by a UE for SL communications, in accordance with an example implementation of the present application.

In action 1602, UE 161 may receive at least one SL configuration (e.g., at least one SL-SR/SL-BSR/SL-PHR configuration) from (the serving gNB/cell of) RAN 163.

In action 1604, UE 161 may transmit a report to scheduler UE 165 through the second radio access interface (e.g., an NR/LTE PC5 interface) based on the SL configuration(s) received from RAN 163.

Figure 17:
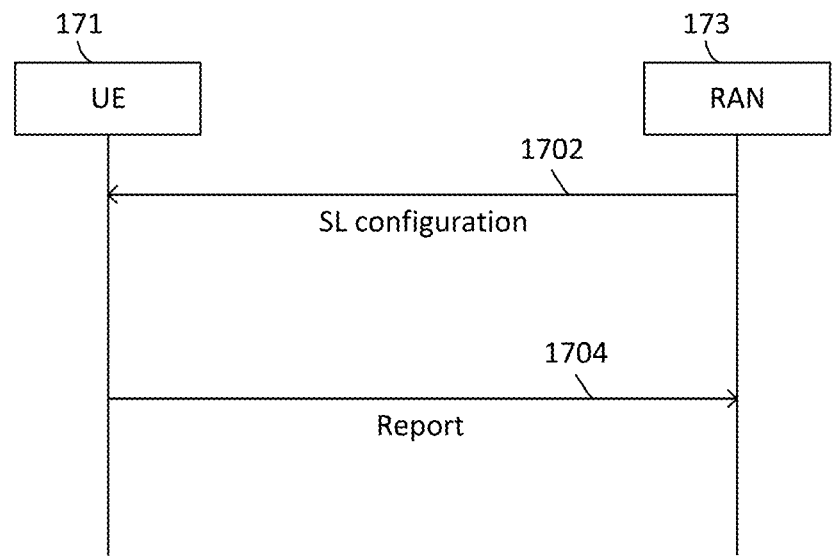
FIG. 17 is a flowchart of a method performed by a UE for SL communications, in accordance with an example implementation of the present application.

FIG. 17 is a flowchart of a method performed by a UE for SL communications, in accordance with an example implementation of the present application.

In action 1702, UE 171 may receive at least one SL configuration (e.g., at least one SL-SR/SL-BSR/SL-PHR configuration) from (the serving gNB/cell of) RAN 173.

In action 1704, UE 161 may transmit a report to RAN 173 through the second radio access interface (e.g., an NR/LTE Uu interface) based on the SL configuration(s) received from RAN 173.

Figure 18:
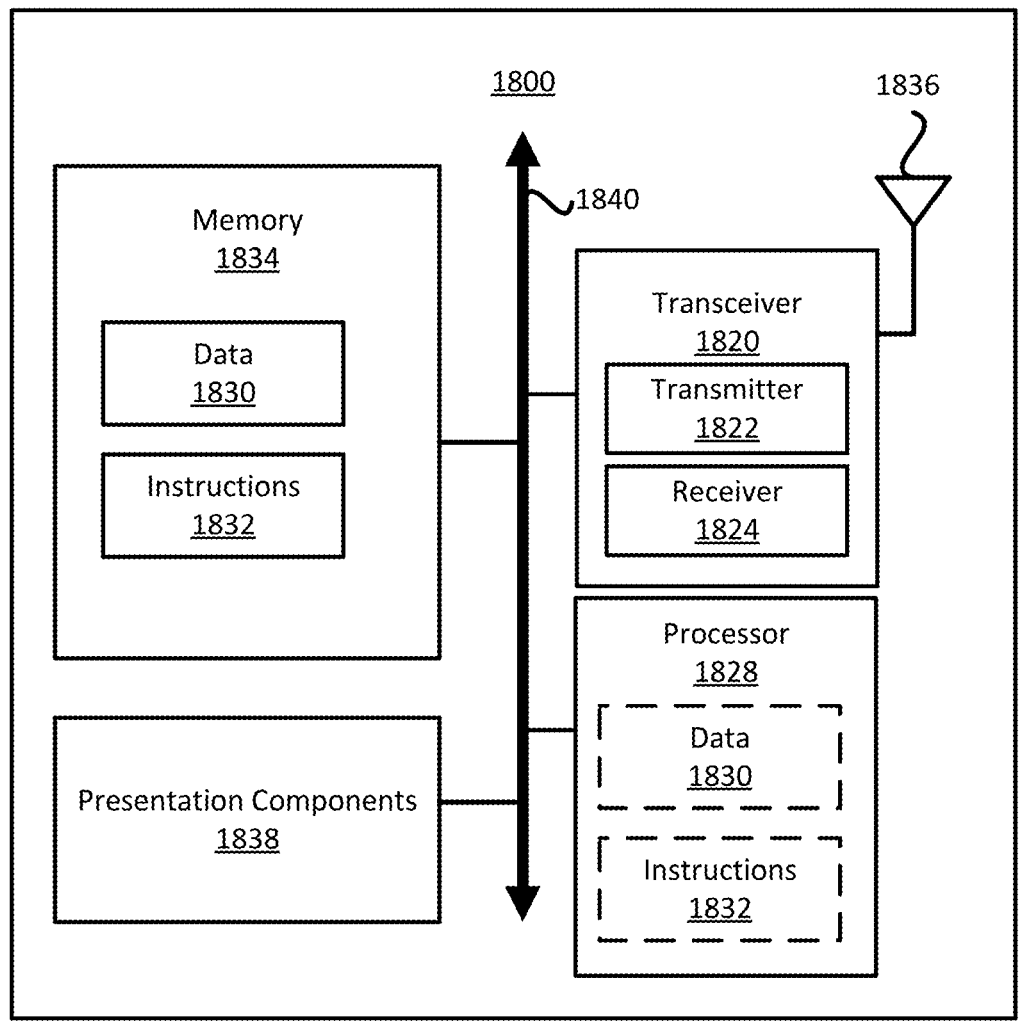
FIG. 18 is a block diagram illustrating a node for wireless communication, in accordance with an example implementation of the present application.

FIG. 18 is a block diagram illustrating a node for wireless communication, in accordance with an example implementation of the present application. As shown in FIG. 18, a node 1800 may include a transceiver 1820, a processor 1828, a memory 1834, one or more presentation components 1838, and at least one antenna 1836. The node 1800 may also include a Radio Frequency (RF) spectrum band module, a BS communications module, a network communications module, and a system communications management module, Input/Output (I/O) ports, I/O components, and power supply (not explicitly shown in FIG. 18). Each of these components may be in communication with each other, directly or indirectly, over one or more buses 1840. In one implementation, the node 1800 may be a UE, a BS, or any other apparatus of wireless communications that performs various functions described herein, for example, with reference to FIGS. 1 through 17.

The transceiver 1820 having a transmitter 1822 (e.g., transmitting/transmission circuitry) and a receiver 1824 (e.g., receiving/reception circuitry) may be configured to transmit and/or receive time and/or frequency resource partitioning information. In some implementations, the transceiver 1820 may be configured to transmit in different types of subframes and slots including, but are not limited to, usable, non-usable and flexibly usable subframes and slot formats. The transceiver 1820 may be configured to receive data and control channels.

The node 1800 may include a variety of computer-readable media. Computer-readable media may be any available media that may be accessed by the node 1800 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

The memory 1834 may include computer-storage media in the form of volatile and/or non-volatile memory. The memory 1834 may be removable, non-removable, or a combination thereof. Examples of memory includes solid-state memory, hard drives, optical-disc drives, etc. As illustrated in FIG. 18, The memory 1834 may store computer-readable, computer-executable instructions 1832 (e.g., software codes) that are configured to, when executed, cause the processor 1828 to perform various functions described herein, for example, with reference to FIGS. 1 through 17. Alternatively, the instructions 1832 may not be directly executable by the processor 1828 but be configured to cause the node 1800 (e.g., when compiled and executed) to perform various functions described herein.

The processor 1828 (e.g., having processing circuitry) may include a Central Processing Unit (CPU), a microcontroller, an ASIC, an intelligent hardware device, or any combinations thereof configured to perform the functions described herein. The processor 1828 may include memory. The processor 1828 may process the data 1830 and the instructions 1832 received from the memory 1834, and information through the transceiver 1820, the base band communications module, and/or the network communications module. The processor 1828 may also process information to be sent to the transceiver 1820 for transmission through the antenna 1836, to the network communications module for transmission to a core network.

One or more presentation components 1838 may present data indications to a person or other devices. Examples of presentation components 1838 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of wireless communications performed by a user equipment (UE), the method comprising:
    performing a first Medium Access Control (MAC) procedure on a first radio access interface for a first Sidelink (SL) connection, which is on a second radio access interface, between the UE and a target UE of a first destination; and
    releasing or canceling the first MAC procedure in a case that the UE is indicated to perform an MAC reset operation associated with the first SL connection based on at least one triggering event associated with the target UE and the second radio access interface,
    wherein the first radio access interface is one of a New Radio (NR) Uu interface or an Evolved Universal Terrestrial Radio Access (E-UTRA) Uu interface associated with at least one serving cell, and the second radio access interface is one of an NR PC5 interface or an E-UTRA PC5 interface.

2. The method of claim 1, wherein the MAC reset operation associated with the first SL connection is indicated by a Radio Resource Control (RRC) entity of the UE, and the at least one triggering event comprises at least one of:
    receiving, by the RRC entity of the UE, a message indicating an SL specific reset instruction from the target UE; or
    determining, by the RRC entity of the UE, that an SL Radio Link Failure (RLF) event associated with the first destination has been detected on the second radio access interface.

3. The method of claim 1, wherein the first MAC procedure comprises at least a Buffer Status Report (BSR) procedure associated with the first SL connection between the UE and the target UE.

4. The method of claim 1, wherein the first MAC procedure comprises at least a Scheduling Request (SR) procedure associated with the first SL connection between the UE and the target UE.

5. The method of claim 1, further comprising:
performing a second MAC procedure on the first radio access interface for a second SL connection, which is on the second radio access interface, between the UE and a second target UE of a second destination; and
maintaining the second MAC procedure in a case that the UE is indicated to perform the MAC reset operation associated with the first SL connection based on the at least one triggering event associated with the target UE and the second radio access interface.

6. The method of claim 5, wherein the second MAC procedure comprises at least a Buffer Status Report (BSR) procedure associated with both the first SL connection between the UE and the target UE and the second SL connection between the UE and the second target UE.

7. The method of claim 5, wherein the second MAC procedure comprises at least a Scheduling Request (SR) procedure associated with both the first SL connection between the UE and the target UE and the second SL connection between the UE and the second target UE.

8. A user equipment (UE) for performing wireless communications, the UE comprising:
one or more non-transitory computer-readable media storing one or more computer-executable instructions; and
at least one processor coupled to the one or more non-transitory computer-readable media, and configured to execute the one or more computer-executable instructions to:
perform a first Medium Access Control (MAC) procedure on a first radio access interface for a first Sidelink (SL) connection, which is on a second radio access interface, between the UE and a target UE of a first destination; and
release or cancel the first MAC procedure in a case that the UE is indicated to perform an MAC reset operation associated with the first SL connection based on at least one triggering event associated with the target UE and the second radio access interface,
wherein the first radio access interface is one of a New Radio (NR) Uu interface or an Evolved Universal Terrestrial Radio Access (E-UTRA) Uu interface associated with at least one serving cell, and the second radio access interface is one of an NR PC5 interface or an E-UTRA PC5 interface.

9. The UE of claim 8, wherein the MAC reset operation associated with the first SL connection is indicated by a Radio Resource Control (RRC) entity of the UE, and the at least one triggering event comprises at least one of:
receiving, by the RRC entity of the UE, a message indicating an SL specific reset instruction from the target UE; or
determining, by the RRC entity of the UE, that an SL Radio Link Failure (RLF) event associated with the first destination has been detected on the second radio access interface.

10. The UE of claim 8, wherein the first MAC procedure comprises at least a Buffer Status Report (BSR) procedure associated with the first SL connection between the UE and the target UE.

11. The UE of claim 8, wherein the first MAC procedure comprises at least a Scheduling Request (SR) procedure associated with the first SL connection between the UE and the target UE.

12. The UE of claim 8, wherein the at least one processor is further configured to execute the one or more computer-executable instructions to:
perform a second MAC procedure on the first radio access interface for a second SL connection, which is on a second radio access interface, between the UE and a second target UE of a second destination on the second radio access interface; and
maintain the second MAC procedure in a case that the UE is indicated to perform the MAC reset operation associated with the first SL connection based on the at least one triggering event associated with the target UE and the second radio access interface.

13. The UE of claim 12, wherein the second MAC procedure comprises at least a Buffer Status Report (BSR) procedure associated with both the first SL connection between the UE and the target UE and the second SL connection between the UE and the second target UE.

14. The UE of claim 12, wherein the second MAC procedure comprises at least a Scheduling Request (SR) procedure associated with both the first SL connection between the UE and the target UE and the second SL connection between the UE and the second target UE.

* * * * *